(12) United States Patent
Ibragimov et al.

(10) Patent No.: US 10,470,254 B2
(45) Date of Patent: Nov. 5, 2019

(54) RF ENERGY APPLICATION BASED ON ABSORPTION PEAKS

(71) Applicant: GOJI LIMITED, Hamilton (BM)

(72) Inventors: Zalman Ibragimov, Rehovot (IL); Amit Rappel, Ofra (IL)

(73) Assignee: GOJI LIMITED, Hamilton (BM)

( * ) Notice: Subject to any disclaimer, the term of this patent is extended or adjusted under 35 U.S.C. 154(b) by 912 days.

(21) Appl. No.: 14/982,225

(22) Filed: Dec. 29, 2015

(65) Prior Publication Data

US 2016/0113072 A1    Apr. 21, 2016

Related U.S. Application Data

(63) Continuation of application No. 13/901,818, filed on May 24, 2013, now Pat. No. 9,301,344.

(60) Provisional application No. 61/749,705, filed on Jan. 7, 2013, provisional application No. 61/651,156, filed on May 24, 2012.

(51) Int. Cl.
*H05B 6/64* (2006.01)
*H05B 6/68* (2006.01)
*H05B 6/70* (2006.01)

(52) U.S. Cl.
CPC ......... *H05B 6/6467* (2013.01); *H05B 6/6447* (2013.01); *H05B 6/68* (2013.01); *H05B 6/688* (2013.01); *H05B 6/70* (2013.01); *H05B 6/705* (2013.01); *Y02B 40/143* (2013.01)

(58) Field of Classification Search
CPC ........ H05B 6/6447; H05B 6/68; H05B 6/705; H05B 6/688; H05B 6/6467; H05B 6/70; Y02B 40/143
USPC ........ 219/709, 746, 748, 750, 696; 324/646, 324/640, 643, 644, 636, 637; 315/502; 156/345.42
See application file for complete search history.

(56) References Cited

U.S. PATENT DOCUMENTS

| | | |
|---|---|---|
| 2008/0190560 A1 | 8/2008 | Tian et al. |
| 2010/0176123 A1 | 7/2010 | Mihara et al. |
| 2011/0168699 A1 | 7/2011 | Oomori et al. |
| 2011/0315678 A1* | 12/2011 | Furuya ................. H05B 6/701 219/690 |

FOREIGN PATENT DOCUMENTS

WO      2010/147439 A2     12/2010

* cited by examiner

*Primary Examiner* — Quang T Van
(74) *Attorney, Agent, or Firm* — Greenblum & Bernstein, P.L.C.

(57) ABSTRACT

An object is processed in a cavity resonator by application of radiofrequency energy to the cavity resonator through a plurality of feeds. Excitation setups are grouped into a plurality of peaks based on values of an absorbability indicator associated with each of the excitation setups. At least one peak among the plurality of peaks is selected based on the values of the absorbability indicator associated with the excitation setups grouped into each peak. Radiofrequency energy is applied to the cavity resonator based on the selection, in which the excitation setups are multi-dimensional.

9 Claims, 10 Drawing Sheets

RF ENERGY APPLICATION BASED ON ABSORPTION PEAKS

RELATED APPLICATIONS

This application is a continuation application of co-pending U.S. patent application Ser. No. 13/901,818, filed May 24, 2013, which claims the benefit of U.S. Provisional Patent Application No. 61/651,156, filed on May 24, 2012 and U.S. Provisional Patent Application No. 61/749,705, filed on Jan. 7, 2013. The disclosures of all of these applications are incorporated herein by reference.

TECHNICAL FIELD

This is a U.S. patent application relating to a device and method for applying electromagnetic energy, and more particularly but not exclusively to device and method for applying RF energy based on electromagnetic (EM) feedback.

BACKGROUND

EM waves have been used in various applications to supply energy to objects. In the case of radio frequency (RF) radiation for example, EM energy may be supplied using a magnetron, which is typically tuned to a single frequency for supplying EM energy only in that frequency. One example of a commonly used device for supplying RF energy is a microwave oven. Typical microwave ovens supply EM energy at or about a single frequency of 2.45 GHz.

Microwave ovens are known to apply energy at a non-uniform manner. It has been suggested that uniformity of RF heating may be improved if energy is applied at many different frequencies. It was also suggested that if a same amount of energy is absorbed at each frequency, this may enhance uniformity.

SUMMARY OF A FEW EXEMPLARY ASPECTS OF THE DISCLOSURE

Some exemplary aspects of the disclosure include apparatuses and methods for applying EM energy to an object in an energy application zone and more particularly for processing objects by RF energy.

Some exemplary aspects of the invention may be directed to a method for processing objects by RF energy. In some embodiments the method may include selecting a first group of excitation setups corresponding to a first peak and selecting a second group of excitation setups corresponding to a second peak. The method may further include applying RF energy such that an amount of RF energy absorbed at excitation setups of the first group is substantially the same as an amount of RF energy absorbed at excitation setups of the second group.

In some embodiments, the method may further include selecting the first and second groups from among a plurality of groups corresponding to a plurality of peaks.

In some embodiments, the selecting may be based on one or more relative peak selection criteria.

In some embodiments, applying the RF energy may be limited to excitation setups belonging to the first and second groups.

In some embodiments, the method may further include selecting one or more excitation setups from the first group; selecting one or more excitation setups from the second group; and applying the RF energy only at the selected excitation setups from the first group and from the second group.

In some such embodiments, a number of the selected excitation setups from the first group may be the same as a number of the selected excitation steps from the second group. In other embodiments, a number of the selected excitation setups from the first group may be different from a number of the selected excitation setups from the second group.

In some embodiments, the selecting one or more excitation setups from the first group and from the second group may include selecting according to an absorbability indicator associated with the excitation setups.

In some embodiments, the selecting one or more excitation setups from the first group comprises selecting excitation setups associated with absorbability values larger than a first threshold; and the selecting one or more excitation steps from the second group may include selecting excitation setups associated with absorbability values larger than a second threshold. The second threshold may be different from the first or may be identical to the first.

In some embodiments, a number of the selected excitation setups from the first group is the same as a number of the selected excitation steps from the second group; and applying the RF energy may result in a first amount of energy absorbed in the one or more excitation setups from the first group being the substantially the same as a second amount of energy absorbed in the one or more excitation setups from the second group.

In some embodiments, the application of energy to at least one of the first and second groups occurs through application of equal energy quanta each applied to a different excitation setup in the first or second group.

For example, the selected excitation setup from the first group may be associated with a higher absorbability value than other excitation setups in the first group; and the selected excitation setup from the second group may be associated with a higher absorbability value than other excitation setups in the second group.

In some embodiments, selecting excitation setups may include selecting first and second groups according to whether first and second peaks corresponding to the first and second groups have a local maximum above a threshold.

In some embodiments, the selecting may include selecting first and second groups based on whether the corresponding first and second peaks each define an area larger than a threshold.

Additionally or alternatively, the selecting may include selecting first and second groups such that the corresponding first and second peaks each have a width within a predetermined range.

Still additionally or alternatively, the selecting may include selecting first and second groups such that each of the corresponding first and second peaks is separated from other peaks by more than a separation threshold.

Other exemplary aspects of the invention may be directed to an apparatus for processing an object by RF energy. The apparatus may include a memory storing instructions. The apparatus may further include a processor configured to execute the instructions to select a first group of excitation setups corresponding to a first peak and a second group of excitation setups corresponding to a second peak. The processor may be further configured to cause application of RF energy, such that an amount of RF energy absorbed at excitation setups of the first group is substantially the same as an amount of applied RF energy absorbed at excitation setups of the second group.

In some embodiments, the processor may be further configured to select the first and second groups from among a plurality of groups corresponding to a plurality of peaks.

In some embodiments, the processor may be further configured to:

select one or more excitation setups from the first group; and select one or more excitation setups from the second group. In some embodiments, causing the application of RF energy may be limited to the selected excitation setups from the first group and to the selected excitation setups from the second group.

In some embodiments, a number of the selected excitation setups from the first group is the same as a number of the selected excitation steps from the second group.

In some embodiments, a number of selected excitation setups from the first group is different from a number of selected excitation steps from the second group.

In some embodiments, each of selecting the one or more excitation setups from the first group and selecting the one or more excitation steps from the second group may be based on an absorbability indicator associated with the excitation setups.

In some embodiments, selecting the one or more excitation setups from the first group may include selecting excitation setups associated with absorbability values larger than a first threshold. Additionally or alternatively, selecting the one or more excitation steps from the second group may include selecting excitation setups associated with absorbability values larger than a second threshold.

In some embodiments, the first and second thresholds are different. In other embodiments, the first and second thresholds may be identical.

In some embodiments, applying the RF energy may be in such a manner that a first amount of energy absorbed at the one or more excitation setups from the first group is substantially the same as a second amount of energy absorbed at the one or more excitation setups from the second group. Additionally or alternatively, a number of selected excitation setups from the first group may be the same as a number of selected excitation steps from the second group.

In some embodiments, the processor may be further configured to cause the application of energy to at least one of the first and second groups to occur through application of equal energy quanta each applied to a different excitation setup in the first or second group.

For example, the selected excitation setup from the first group may be associated with a higher absorbability value than other excitation setups in the first group; and the selected excitation setup from the second group is associated with a higher absorbability value than other excitation setups in the second group.

In some embodiments, the processor may be further configured to determine an amount of energy to be absorbed in one of the first or second groups. The amount of energy may include a plurality of equal energy quanta. The processor may be further configured to cause application of the determined amount of energy such that each of the plurality of energy quanta is absorbed in a different excitation setup within the one of the first or second groups.

In some embodiments, the selecting may include selecting first and second groups according to whether first and second peaks corresponding to the first and second groups constitute a local maximum above a threshold.

In some embodiments, the selecting may include selecting first and second groups based on whether the corresponding first and second peaks each define an area larger than a threshold.

In some embodiments, the selecting may include selecting first and second groups such that the corresponding first and second peaks each have a width within a predetermined range.

In some embodiments, the selecting comprises selecting first and second groups such that each of the corresponding first and second peaks is separated from other peaks by more than a separation threshold.

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In one respect, the invention may involve apparatus and methods for applying EM energy. The term EM energy, as used herein, includes energy deliverable by EM radiation in all or portions of the EM spectrum, including but not limited to, radio frequency (RF), infrared (IR), near infrared, visible light, ultraviolet, etc. In one particular example, applied EM energy may include RF energy with a wavelength in free space of 100 km to 1 mm, which corresponds to a frequency of 3 KHz to 300 GHz, respectively. In some other examples, the applied EM energy may fall within frequency bands between 500 MHz to 1500 MHz or between 700 MHz to 1200 MHz or between 800 MHz-1 GHz. Applying energy in the RF portion of the EM spectrum is referred herein as applying RF energy. Microwave and ultra high frequency (UHF) energy, for example, are both within the RF range. In some other examples, the applied EM energy may fall only within one or more ISM frequency bands, for example, between 433.05 and 434.79 MHz, between 902 and 928 MHz, between 2400 and 2500 MHz, and/or between 5725 and 5875 MHz. Even though examples of the invention are described herein in connection with the application of RF energy, these descriptions are provided to illustrate a few exemplary principles of the invention, and are not intended to limit the invention to any particular portion of the EM spectrum.

Figure 1:
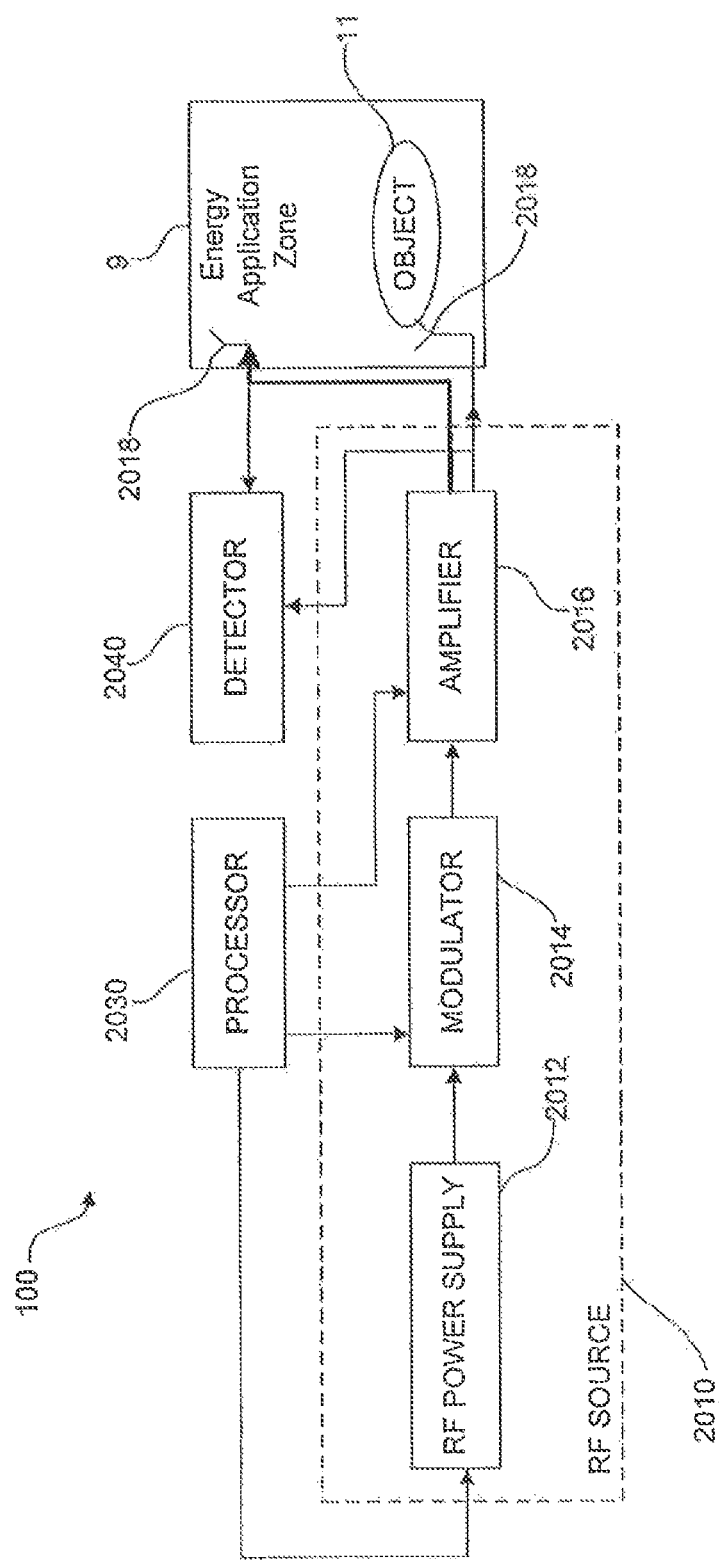
FIG. 1 is a diagrammatic representation of an apparatus for applying EM energy to an object, in accordance with some exemplary embodiments of the present invention.

In certain embodiments, the application of EM energy may occur in an "energy application zone", such as energy application zone 9, as shown in FIG. 1. Energy application zone 9 may include any void, location, region, or area where EM energy may be applied. It may be hollow, or may be filled or partially filled with liquids, solids, gases, or combinations thereof. By way of example only, energy application zone 9 may include an interior of an enclosure, interior of a partial enclosure, solid, or partial solid, that allows existence, propagation, and/or resonance of EM waves, for example, standing waves and/or quasi-propagating waves. In some embodiments, energy application zone includes only these parts of space to which energy is deliberately delivered. For example, if some RF energy leaks from a microwave oven to the kitchen surrounding it, this does not make the kitchen as a whole an energy application zone. Zone 9 may include a conveyor belt or a rotating plate. For purposes of this disclosure, all such energy application zones may alternatively be referred to as cavities. It is to be understood that an object is considered "in" the energy application zone if at least a portion of the object is located in the zone.

In accordance with some embodiments of the invention, an apparatus or method may involve the use of at least one source configured to deliver EM energy to the energy application zone. A "source" may include any component(s) that are suitable for generating and delivering EM energy. Consistent with some embodiments of the invention, EM energy may be delivered to the energy application zone in the form of propagating EM waves at predetermined wavelengths or frequencies (also known as EM radiation). As used consistently herein, "propagating EM waves" may include resonating waves, evanescent waves, and waves that travel through a medium in any other manner. EM radiation carries energy that may be imparted to (or dissipated into) matter with which it interacts.

As used herein, if a machine (e.g., a processor) is described as "configured to" perform a task (e.g., configured to cause application of a predetermined field pattern), then, at least in some embodiments, the machine may include components, parts, or aspects (e.g., software) that enable the machine to perform the particular task. In some embodiments, the machine may perform this task during operation. Similarly, when a task is described as being done "in order to" establish a target result (e.g., in order to apply a plurality of electromagnetic field patterns to the object), then, at least in some embodiments, carrying out the task may accomplish the target result.

In certain embodiments, EM energy may be applied to an object 11. References to an "object" (or "object to be heated") to which EM energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply, even nominally, EM energy. Applying energy to an energy application zone encompassing at least a portion of the object may be referred to herein as applying energy to the object, regardless of how much, if any, of this energy is absorbed by the object.

A portion of EM energy supplied to energy application zone 9 may be absorbed by object 11. In some embodiments, another portion of the EM energy applied or delivered to energy application zone 9 may be absorbed by various elements (e.g., additional objects, structures associated with zone 9, or any other EM energy-absorbing materials found in zone 9) associated with energy application zone 9. Energy application zone 9 may also include loss constituents that do not, themselves, absorb an appreciable amount of EM energy, but otherwise account for EM energy losses. Such loss constitutes may include, for example, cracks, seams, joints, doors, or any other loss mechanisms associated with energy application zone 9. Nevertheless, the energy absorbed in the object may be approximated by the energy absorbed by the energy application zone.

FIG. 1 is a diagrammatic representation of an apparatus 100 for applying EM energy to an object.

Exemplary energy application zone 9 may include locations where energy is applied in an oven, chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the energy application zone may be part of a vending machine, in which objects are processed once purchased. Thus, consistent with the presently disclosed embodiments, energy application zone 9 may include an EM resonator (also known as cavity resonator, or cavity). At times, energy application zone 9 may be congruent with the object or a portion of the object (e.g., the object or a portion thereof, is or may define the energy application zone).

Zone 9 may be cylindrical in shape (or any other suitable shape, such as semi-cylindrical, spherical, semi-spherical, rectangular, elliptical, cuboid, symmetrical, asymmetrical, irregular, regular, among others) and may be made of a conductor, such as aluminum, stainless steel or any suitable metal or other conductive material. In some embodiments, zone 9 may include walls coated and/or covered with a protective coating, for example, made from materials transparent to EM energy at frequencies generated by the source, e.g., metallic oxides or others. Zone 9 may be resonant in a predetermined range of frequencies (e.g., within the UHF or microwave range of frequencies, such as between 300 MHz and 3 GHz, or between 400 MHz and 1 GHz). It is also contemplated that zone 9 may be closed, e.g., completely enclosed (e.g., by conductor materials), bounded at least partially, or open, e.g., having non-bounded openings. The general methodology of the invention is not limited to any particular cavity shape or configuration, as discussed earlier.

In the presently disclosed embodiments, at least one feed and/or one or more radiating elements may be provided. The radiating elements (which may also be referred to as "antennas") may be located on one or more surfaces of, e.g., an enclosure defining the energy application zone. Alternatively, radiating elements may be located inside or outside the energy application zone. One or more of the radiating elements may be near to, in contact with, in the vicinity of or even embedded in object 11 (e.g., when the object is a liquid). The orientation and/or configuration of each radiating element may be distinct or the same, based on the specific energy application, e.g., based on a desired target effect. Each radiating element may be positioned, adjusted, and/or oriented to emit EM waves along a same direction, or various different directions. Furthermore, the location, orientation, and configuration of each radiating element may be predetermined before applying energy to the object. Alternatively or additionally, the location, orientation, and/or configuration of each radiating element may be dynamically adjusted, for example, by using a processor, during operation of the apparatus and/or between rounds of energy application. The invention is not limited to radiating elements having particular structures or locations within the apparatus.

As shown in FIG. 1, apparatus 100 may include at least one radiating element 2018 for delivery of EM energy to energy application zone 9. One or more of the radiating element(s) may also be configured to receive EM energy from energy application zone 9. In other words, radiating element, as used herein may function as a emitter, a receiver, or both, depending on a particular application and configuration.

As used herein, the term "radiating element" may broadly refer to any structure from which EM energy may radiate and/or be received. For example, a radiating element may include an aperture/slot radiating element, plurality of terminals emitting in unison, either at the same time or at a controlled dynamic phase difference (e.g., a phased array radiating element). Consistent with some exemplary embodiments, radiating elements 2018 may include an EM energy emitter (referred to herein as "an emitting radiating element") that feeds energy into energy application zone 9, an EM energy receiver (referred to herein as "a receiving radiating element") that receives energy from zone 9, or a combination of both an emitter and a receiver. For example, a first radiating element may supply EM energy to zone 9, and a second radiating element may receive energy from the first radiating element. In some embodiments, one or more radiating elements may each serve as both receivers and emitters. In some embodiments, one or more radiating elements may serve a dual function while one or more other radiating elements may serve a single function. So, for example, a plurality of radiating elements could be used, where at least one of the plurality of radiating elements may be configured to both deliver EM energy to zone 9 and to receive EM energy via zone 9. In addition to or as an alternative to delivering and/or receiving energy, a radiating element may also be adjusted to affect the field pattern. For example, various properties of the radiating element (e.g., position, location, orientation) may be adjusted. Different radiating element property settings may result in differing EM field patterns within zone 9 thereby affecting energy absorption in the object. Therefore, radiating element adjustments may constitute one or more variables that can be controlled by apparatus 100 for energy application control.

Consistent with the presently disclosed embodiments, energy may be supplied and/or provided to one or more emitting radiating elements. Energy supplied to an emitting radiating element may result in energy emitted by the emitting radiating element (referred to herein as "incident energy"). The incident energy may be delivered to zone 9, and may be in an amount equal to an amount of energy supplied to the emitting radiating element(s) by a source 2010. A portion of the incident energy may be dissipated in the object or absorbed by the object (referred to herein as "dissipated energy" or "absorbed energy"). Another portion may be reflected back to the emitting radiating element (referred to herein as "reflected energy"). Reflected energy may include, for example, energy reflected back to the emitting radiating element due to mismatch caused by the object and/or the energy application zone, e.g., impedance mismatch. Reflected energy may also include energy retained by the port of the emitting radiating element (e.g., energy that is emitted by the radiating element but does not flow into the zone). The rest of the incident energy, other than the reflected energy and dissipated energy, may be emitted to one or more receiving radiating elements other than the emitting radiating element (referred to herein as "coupled energy."). Therefore, the incident energy ("I") supplied to the emitting radiating element may include all of the dissipated energy ("D"), reflected energy ("R"), and coupled energy ("C"), and may be expressed according to the relationship:

$$I=D+R+\Sigma C_i.$$

In accordance with certain aspects of the invention, the one or more emitting radiating elements may deliver EM energy into zone 9. Energy delivered by an emitting radiating element into the zone (referred to herein as "delivered energy" or (d)) may be the incident energy emitted by the radiating element minus the reflected energy at the same radiating element. That is, the delivered energy may be the net energy that flows from the emitting radiating element to the zone, i.e., d=I−D. Alternatively, the delivered energy may also be represented as the sum of reflected energy and coupled energy, i.e., d=R+C (where C=ΣCi).

In certain embodiments, the application of EM energy may occur via one or more power feeds. A feed may include one or more waveguides and/or one or more radiating elements (antennas) for applying RF energy to the zone. Such radiating elements may include, for example, patch radiating elements, fractal radiating elements, helix radiating elements, log-periodic radiating elements, spiral radiating elements, slot radiating elements, dipole radiating elements, loop radiating elements, slow wave radiating elements, leaky wave radiating elements or any other structures capable of emitting and/or receiving RF energy.

The invention is not limited to radiating elements having particular structures or locations. Radiating elements may be polarized in differing directions in order to, for example, reduce coupling, enhance specific field pattern(s), increase the energy delivery efficiency and support and/or enable a specific algorithm(s). The foregoing are examples only, and polarization may be used for other purposes as well. In one example, three radiating elements may be placed parallel to orthogonal coordinates; however, it is contemplated that any suitable number of radiating elements (such as one, two, three, four, five, six, seven, eight, etc.) may be used. For example, a higher number of radiating elements may add flexibility in system design and improve control of energy distribution, e.g., greater uniformity and/or resolution of energy application in zone 9.

Figure 2:
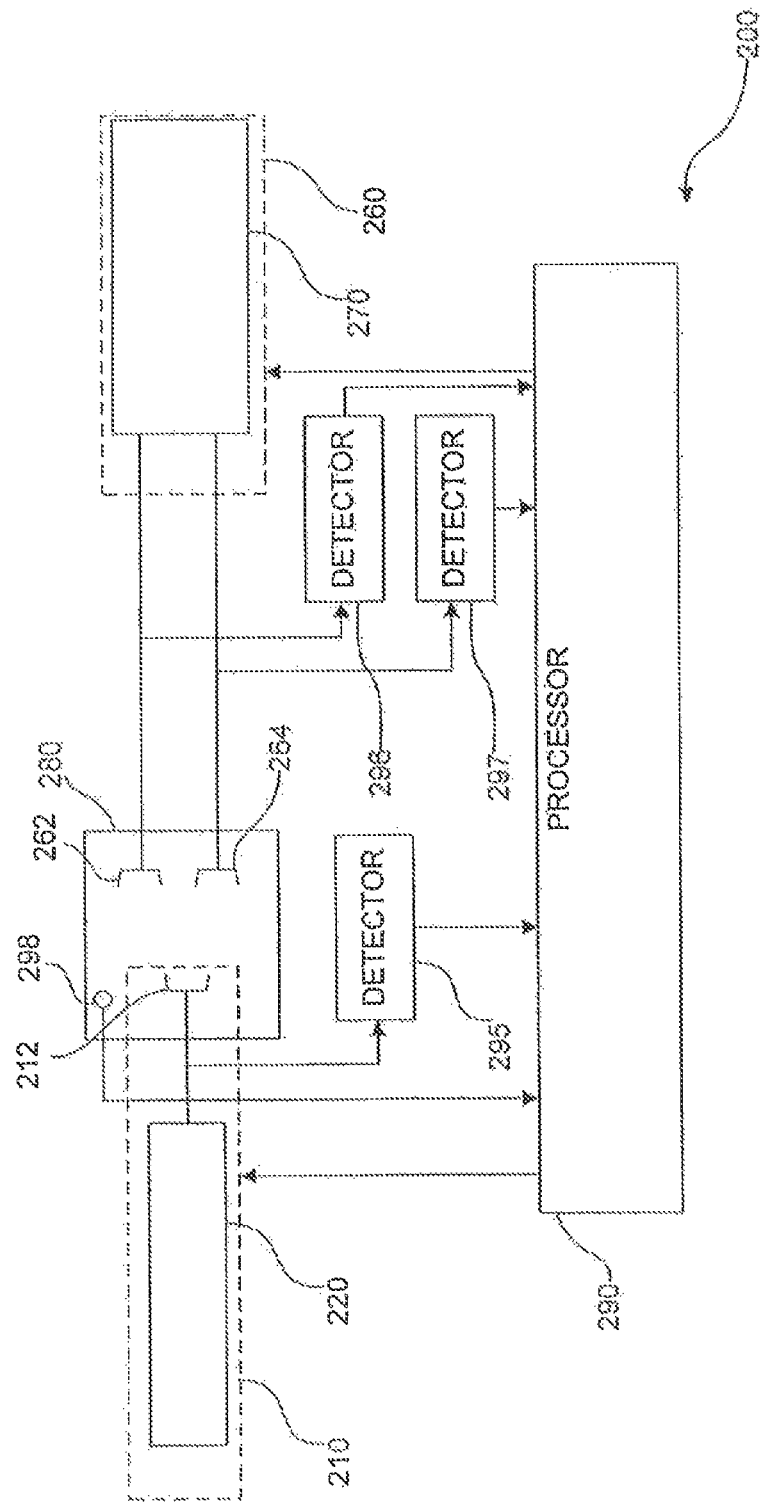
FIG. 2 is a diagrammatic representation of an apparatus for applying EM energy to an object, in accordance with some exemplary embodiments of the present invention.

FIG. 2 is an illustration of an apparatus 200 according to some embodiments of the invention. Apparatus 200 may include one or more energy application units (e.g., 210, 260). An energy application unit may include one or more radiating elements (e.g., 212, 262, 264) and an RF energy source (220, 270) configured to supply RF energy to the radiating element(s). Energy application zone 280 may or may not be part of apparatus 200. Each RF energy source may be structured similarly to source 2010 shown in FIG. 1. In some embodiments, an energy application unit may include two or more synchronized RF energy sources, which may be controlled to feed the radiating elements with signals having a common frequency, for example, at a controlled phase difference, and/or at a controlled amplitude difference, etc. The signals may be emitted during overlapping time periods. In some embodiments, energy may be applied from each of the energy application units individually or, alternatively, energy may be applied concurrently from two or more of the energy application units. In some embodiments, energy application from the energy application units individually may result in the same or similar processing effects as applying energy from two or more of the energy application units concurrently. Therefore, a similar discussion may be relevant both to apparatuses including one energy application unit and to apparatuses including a plurality of energy application units, and the invention may be implemented irrespective of the number of energy application units included in the apparatus. An energy application unit may be controlled by a processor 290, which may be the same as processor 2030, shown in FIG. 1. For example, processor 290 may set the value of each controllable field affecting parameter (c-FAP) to define excitation setups (ESUs) at which energy may be applied to energy application zone 280. The terms c-FAP and excitation setup are further discussed below. In some embodiments, processor 290 may control the energy application units based on input the processor receives from detectors 295, 296, 297. Each of detectors 295, 296, and 297 may receive EM feedback from one of radiating elements 212, 262, and 264, respectively. In some embodiments, processor 290 may control the energy application units based on input the processor receives from sensors (e.g., sensor 298). The sensors may be used to sense any information, for example, EM field intensity, temperature, weight, humidity, motion, etc. The sensed information may be used for any purpose, including for process control, verification, automation, authentication, safety, etc.

An energy application unit according to some embodiments may apply energy in two or more different excitation setups. Applying energy at different excitation setups may result in excitation of different field patterns in the energy application zone. The excitation setups may differ from one another by one or more values of parameters that may affect the field pattern and may be controlled by components of the apparatus. Such a parameter is referred to herein as a controllable field affecting parameter (c-FAP). In some embodiments, a value may be selected for each c-FAP, and the excitation setup may be defined by the selected values. Varying a selected value of even one c-FAP varies the excitation setup, which, in turn, may vary the field pattern excited in the energy application zone.

In some cases, varying c-FAP values may result in significant variations in the generated field patterns. In other instances, however, varying values of c-FAPs may produce little or no change in the generated field patterns (e.g., if the variation between the two values of the c-FAP is small).

Applying energy at a particular excitation setup may excite an EM field pattern in the energy application zone. For brevity, this excited EM field pattern may be referred to as an excitation. Thus, each excitation setup may correspond to an excitation; and a reference to a supply, reception, absorption, leakage, etc. of an excitation setup may refer to a supply, reception, absorption, leakage, etc. of the corresponding excitation. Thus, for example, a statement that a given excitation or excitation setup is absorbed in the object may mean that energy associated with an electromagnetic field excited by the energy application unit at the given excitation setup is absorbed in the object.

Various apparatuses may allow the control of different field affecting parameters. For example, in some embodiments, an apparatus may include a controller that controls the frequency of an EM wave applied by an energy application unit to the energy application zone. In such apparatuses, the frequency may be available as a c-FAP. In one example, such an apparatus may control the frequency to have any of two or more value (e.g. 800 MHz, 800.5 MHz). By controlling the frequency and changing from one frequency value to another, the excitation setup may be changed, which, in turn, may change an EM field pattern excited in the energy application zone.

In another example, an energy application unit may include two radiating elements that emit radiation at a controllable phase difference. The phase difference may be controlled to have two or more values (e.g., 0°, 90°, 180°, or 270°). The phase difference between EM fields emitted by the two radiating elements may be available to the apparatus comprising the energy application unit as a c-FAP.

In another example, a difference between intensities at which two radiating elements emit EM fields of the same frequency may be controlled, and thus may be available as a c-FAP.

In another example, an energy application zone may include one or more conductive elements (e.g., rods), each of which may be controlled to be either in a floating state or in a connected state. For example, a rod in a floating state, may be electrically isolated from sources of electrical potential. A rod in a connected state, however, may be electrically connected to one or more sources of electrical potential (e.g., ground or various voltage levels). A state of each rod (i.e. floating or connected) may affect the EM field pattern excited in the energy application zone. In apparatuses having such rods, the state of each rod may constitute a c-FAP.

In another example, an energy application zone may include a magnetizable element (e.g., at a wall of the energy application zone) and an electromagnet near the magnetizable element. The magnetizable element and the electromagnet may be arranged such that a field pattern excited in the energy application zone may be affected by current flowing in the electromagnet. In some embodiments the current may be controllable and the value of the current (e.g., 1 mA, 20 mA, 500 mA, etc.) may be available as a c-FAP.

In another example, an energy application unit may include a plurality of radiating elements which may be turned on or off, e.g., independently of one another. In such embodiments, the status of each radiating element (e.g., on or off) may be available as a c-FAP. Additionally, or alternatively, the total number of radiating elements turned on may constitute a c-FAP.

Other examples of parameters that may serve as controllable field affecting parameters in some embodiments may include the position of a radiating element, orientation of a radiating element, position and/or orientation of conducting elements in the energy application zone, cavity dimensions, or any other controllable parameter, the value of which may affect a field pattern excited in the energy application zone upon RF energy application to the zone.

Excitation setups including only a single c-FAP may be referred to as one-dimensional excitation setups. An excitation setup including multiple c-FAPs may be referred to as a multi-dimensional excitation setup. For example, an apparatus configured to control the state of each of six rods to be either floating or connected may have a six-dimensional excitation setup. Two examples of such excitation setups may be: (floating, floating, floating, connected, connected, connected), and (floating, connected, connected, floating, floating, connected). In general, the number of c-FAPs available to an apparatus may determine a dimension of the excitation setups available to the apparatus. The collection of all the excitations that may be excited by an apparatus (or the collection of all the excitation setups available to an apparatus) may be referred to as the excitation space of the apparatus. The dimension of an excitation space of an apparatus may be the same as the dimension of each excitation setup available to that apparatus.

In some embodiments, an energy application unit may be controlled by a processor configured to control energy application in accordance with feedback. The feedback may be indicative, for example, of the temperature, weight, position, volume, or any other characteristic of the object. Additionally, or alternatively, the feedback may include electromagnetic (EM) feedback.

As used herein, EM feedback may include any received signal or any value calculated based on one or more received signals, which may be indicative of the dielectric response of the cavity and/or the object to EM fields excited in the cavity. For example, EM feedback may include input and output power levels, network parameters (e.g., S parameters, Y parameters, reflection and transmission coefficients, impedances, etc, as well as values derivable from such parameters). Examples of derivable values may include dissipation ratios (discussed below), time or excitation setup derivatives of any of the above, etc. EM feedback may be excitation-dependent, for example, may include signals, the values of which may vary over different excitation setups. Therefore, EM feedback measured when energy is applied at various excitation setups may be used for controlling energy application.

Returning to FIG. 1, the figure provides a diagrammatic representation of an exemplary apparatus 100 for applying EM energy to an object, in accordance with some embodiments of the present invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency, and amplitude of an EM wave generated by power supply 2012. Processor 2030 may alternatively or additionally regulate at least one of location, orientation, and configuration of each radiating element 2018, for example, using an electro-mechanical device. Such an electromechanical device may include a motor or other movable structure for rotating, pivoting, shifting, sliding or otherwise changing the orientation and/or location of one or more of radiating elements 2018.

In certain embodiments, there may be provided at least one processor. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause EM energy to be applied to zone 9 via one or more radiating elements, for example across a series of excitation setups, in order to apply EM energy at each such excitation setup to an object 11. For example, the at least one processor may be configured to regulate one or more components of processor 2030 in order to cause the energy to be applied.

In certain embodiments, the at least one processor may be configured to determine a value indicative of energy absorbable by the object at each of a plurality of excitation setups. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one excitation setup. For example, a sweep may include the sequential transmission of energy at multiple excitation setups in one or more contiguous excitation setup band; the sequential transmission of energy at multiple excitation setups in more than one non-contiguous excitation setup band; the sequential transmission of energy at individual non-contiguous excitation setups; and/or the transmission of synthesized pulses having a desired excitation setup/power spectral content (e.g., a synthesized pulse in time). The excitation setup bands may be contiguous or non-contiguous. Thus, during an excitation setup sweeping process, the at least one processor may regulate the energy supplied to the at least one radiating element to sequentially deliver EM energy at various excitation setups to zone 9, and to receive feedback which serves as an indicator of the energy absorbable by object 11. While the invention is not limited to any particular measure of feedback indicative of energy absorbable in the object, various exemplary indicative values are discussed below.

During the sweeping process, RF source 2010 may be regulated by processor 2030 based on EM feedback detected by detector 2040 as illustrated in FIG. 1. Processor 2030 may then determine a value indicative of energy absorbable by object 11 at each of a plurality of excitation setups based on the received feedback. Consistent with some of the presently disclosed embodiments, a value indicative of the absorbable energy (also referred to herein as an absorption indicator or AI) may include a dissipation ratio (referred to herein as "DR") associated with each of a plurality of excitation setups. As referred to herein, a "dissipation ratio" (or "absorption efficiency" or "power efficiency"), may be defined as a ratio between EM energy absorbed by object 11 and EM energy supplied to radiating elements 2018.

Energy that may be dissipated or absorbed by an object is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one radiating element and the dissipation ratio. Reflected energy (e.g., the energy not absorbed or emitted) may, for example, be a value indicative of energy absorbed by the object. By way of another example, a processor might calculate or estimate absorbable energy based on the portion of the incident energy that is reflected and the portion that is emitted. That estimate or calculation may serve as a value indicative of absorbed and/or absorbable energy.

During an excitation setup sweep, for example, the at least one processor may be configured to control a source of EM energy such that energy is sequentially supplied to an object at a series of excitation setups. The at least one processor might then receive a signal indicative of energy reflected at each excitation setup and, optionally, also a signal indicative of the energy emitted to other radiating elements at each excitation setup. Using a known amount of incident energy supplied to the radiating element and a known amount of energy reflected and/or emitted (e.g., thereby indicating an amount of energy absorbed at each excitation setup), an absorbable energy indicator may be calculated or estimated. Alternatively, the processor might simply rely on an indicator of reflection and/or transmission as a value indicative of absorbable energy.

Absorbable energy may also include energy that may be dissipated by the structures of the energy application zone in which the object is located (e.g., cavity walls) or leakage of energy at an interface between an oven cavity and an oven door. Because absorption in metallic or conducting material (e.g., the cavity walls or elements within the cavity) is characterized by a large quality factor (also known as a "Q factor"), excitation setups having a large Q factor may be identified as being associated with conducting material, and at times, a choice may be made not to emit energy in such excitation setups. In that case, the amount of EM energy absorbed in the cavity walls may be substantially small, and thus, the amount of EM energy absorbed in the object may be substantially equal to the amount of absorbable energy.

In some of the presently disclosed embodiments, a dissipation ratio may be calculated using formula (1):

$$DR=(P_{in}-P_{rf}-P_{cp})/P_{in} \quad (1)$$

where $P_{in}$ represents the EM energy and/or power supplied to radiating elements 2018, $P_{rf}$ represents the EM energy reflected/returned at those radiating elements that function as emitters, and $P_{cp}$ represents the EM energy coupled at those radiating elements that function as receivers. DR may be a value between 0 and 1, and thus may be represented by a percentage number.

For example, consistent with an embodiment which is designed for three radiating elements 1, 2, and 3, processor 2030 may be configured to determine input reflection coefficients $S_{11}$, $S_{22}$, and $S_{33}$ and the transfer coefficients may be $S_{12}=S_{21}$, $S_{13}=S_{31}$, $S_{23}=S_{32}$ based on a measured power and/or energy information during the sweep. Accordingly, the dissipation ratio DR corresponding to radiating element 1 may be determined based on the above mentioned reflection and transmission coefficients, according to formula (2):

$$DR_1=1-(|S_{11}|^2+|S_{12}|^2+|S_{13}|^2). \quad (2)$$

Alternatively or additionally, another kind of value indicative of energy absorbable by the object may be calculated using formula (2a):

$$\Delta\rho=P_{abs}/(P_{in}-P_{ref}) \quad (2a)$$

Replacing $P_{abs}$ with $(P_{in}-P_{rf}-P_{cp})$, as done above may result in equation (2b) for $\Delta\rho$:

$$\Delta\rho=(P_{in}-P_{rf}-P_{cp})/(P_{in}-P_{rf}) \quad (2b)$$

This absorbability indicator (AI) may measure the amount of dissipated power (or non-detected power) as a portion of the delivered power (e.g., power supplied to, and not returned to the emitting radiating element). It is noted that the incident, reflected, and coupled powers may also be indicative of incident, reflected, and coupled energies, respectively. This AI may be useful to identify frequencies at which the object absorbs a significant portion of the energy delivered to the energy application zone, even if only a portion of the supplied energy is delivered to the zone, and a portion is reflected back to or retained at the emitting radiating element, for example, due to poor matching. The use of $\Delta\rho$ may be limited to apparatuses that provide energy via two or more radiating elements. If only one radiating element exists, no energy may be transmitted from one radiating element to another, and $\Delta\rho$ may equal 1 by definition.

Another example of an absorbability indicator is a gamma parameter, which may be defined to each feed among feeds that emit at a common frequency and during overlapping time periods, e.g., coherently. The gamma parameter may be the ratio between power received by a radiating element and power supplied to the same radiating element. Since the radiating element may receive power from other radiating elements at the same time, the gamma parameter may be larger than 1.

Another example of an absorbability indicator may be a total dissipation ratio, which may be defined as a ratio between the sum of powers supplied to radiating elements that emit simultaneously at a common frequency, and the sum of powers received by the same radiating elements. This total dissipation ratio may have a value between 0 and 1, and does not require measurements to be carried out when each radiating element transmits at a time, as may be required to measure S parameters for obtaining DR as discussed above.

In certain embodiments, the at least one processor may also be configured to cause energy to be supplied to the at least one radiating element in at least a subset of a plurality of excitation setups available to apparatus 100. An amount of energy applied to zone 9 at each excitation setup of the subset of excitation setups may be a function of one or more absorbable energy values, e.g., at the corresponding excitation setup and optionally also at adjacent excitation setups. For example, energy applied to the zone at excitation setup #1 may be a function of the absorbable energy value at excitation setup #1. In another example, energy applied to the zone at a group of neighboring excitation setups may be a function of the absorbable energy values at the same excitation setups.

Adjacent or neighboring excitation setups may include excitation setups that are adjacent to each other along a selected c-FAP, and have identical or similar values of all other c-FAPs. For example, if the c-FAP is two dimensional, (e.g., defined by frequency value and a phase difference value), two excitation setups having a common phase difference value and adjacent frequency values may be considered adjacent excitation setups.

The energy supplied to at least one radiating element 2018 at each of the subset of excitation setups may be determined as a function of the absorbable energy value at each excitation setup (e.g., as a function of a dissipation ratio, input impedance, a combination of the dissipation ratio and the input impedance, or some other indicator). In some embodiments, the subset of the plurality of excitation setups and/or the energy applied to the zone at each of the excitation setups in the subset may be determined based on or in accordance with EM feedback obtained during an excitation setup sweep (e.g., at the available excitation setups). That is, using the EM feedback, the at least one processor may adjust energy applied at each excitation setup such that the energy at a particular excitation setup may in some way be a function of an indicator of absorbable energy (or other EM feedback) at that excitation setup. The invention is not limited to any particular scheme, but rather may encompass any technique for controlling the energy supplied by taking into account an indication of absorbable energy.

In certain embodiments, the at least one processor may be configured to cause energy to be supplied to the at least one radiating element in at least a subset of the plurality of excitation setups, wherein energy applied to the zone at each of the subset of excitation setups is inversely related to the absorbable energy value at the corresponding excitation setup. Such an inverse relationship may involve a general trend—e.g., when an indicator of absorbable energy in a particular excitation setup subset (i.e., one or more excitation setups) tends to be relatively high, the actual incident energy at that excitation setup subset may be relatively low. When an indicator of absorbable energy in a particular excitation setup subset tends to be relatively low, the incident energy may be relatively high. This substantially inverse relationship may be even more closely correlated. For example, the emitted energy may be set such that its product with the absorbable energy value (i.e., the absorbable energy by object 11) is substantially constant across the excitation setups applied.

Some exemplary energy delivery schemes may lead to more spatially uniform energy absorption in the object. As used herein, "spatial uniformity" may refer to a condition where the absorbed energy across the object or a portion (e.g., a selected portion) of the object that is targeted for energy application is substantially constant (for example per volume unit or per mass unit). In some embodiments, the energy absorption is considered "substantially constant" if the variation of the dissipated energy at different locations of the object is lower than a threshold value. For instance, a standard deviation may be calculated based on the distribution of the dissipated energy in the object, and the absorbable energy may be considered "substantially constant" if the standard deviation of between the dissipation values of different parts of the object is less than 50% the average of the dissipation values. Because in many cases spatially uniform energy absorption may result in spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, for example a temperature sensor provided in zone 9. In some embodiments, spatial uniformity may be defined as a condition, where a given property of the object is uniform or substantially uniform after processing, e.g., after a heating process. Examples of such properties may include temperature, readiness degree (e.g., of food cooked in the oven), mean particle size (e.g., in a sintering process), etc.

In order to achieve control over the energy absorption in an object or a portion of an object, processor 2030 may be configured to hold substantially constant the amount of time at which energy is supplied to radiating elements 2018 at each excitation setup, while varying the amount of power supplied at each excitation setup as a function of the absorbable energy value. In some embodiments, processor 2030 may be configured to cause the energy to be supplied to the radiating element at a particular excitation setup or excitation setups at a power level substantially equal to a maximum power level of the device and/or the amplifier at the respective excitation setup(s).

Alternatively or additionally, processor 2030 may be configured to vary the period of time during which energy is applied to each excitation setup as a function of the absorbable energy value. At times, both the duration and power at which each excitation setup is applied are varied as a function of the absorbable energy value. Varying the power and/or duration of energy supplied at each excitation setup may be used to cause substantially uniform energy absorption in the object or to have a controlled spatial pattern of energy absorption, for example, based on feedback indicative of the dissipation properties of the object (e.g., EM feedback) at each emitted excitation setup.

Consistent with some embodiments, processor 2030 may be configured to cause amplifier 2016 to supply no energy at all at particular excitation setup(s). Similarly, at times, for example, if the absorbable energy value exceeds a predetermined threshold, processor 2030 may be configured to cause the radiating element to supply energy at a power level less than a maximum power level of the amplifier.

Because absorbable energy can change based on a host of factors including object temperature, in some embodiments, it may be beneficial to regularly update absorbable energy values and adjust energy application based on the updated absorbable values. These updates can occur multiple times a second, or can occur every few seconds or longer, depending on the requirements of a particular application.

In accordance with an aspect of some embodiments of the invention, the at least one processor (e.g., processor 2030) may be configured to determine a desired and/or target energy absorption level at each of a plurality of excitation setups and adjust energy supplied from the radiating element at each excitation setup in order to obtain the target energy absorption level at each excitation setup. For example, processor 2030 may be configured to target a desired energy absorption level at each excitation setup in order to achieve or approximate substantially uniform energy absorption across a range of excitation setups.

Alternatively, processor 2030 may be configured to provide a target energy absorption level at each of a plurality of object portions, which collectively may be referred to as an energy absorption profile across the object. An absorption profile may include uniform energy absorption in the object, non-uniform energy absorption in the object, differing energy absorption values in differing portions of the object, substantially uniform absorption in one or more portions of the object, or any other desirable pattern of energy absorption in an object or portion(s) of an object.

In some embodiments, the at least one processor may be configured to adjust energy supplied to the radiating element at each excitation setup in order to obtain a desired target energy effect and/or energy effect in the object, for example:

a different amount of energy may be provided to different parts and/or regions of the object.

In some embodiments, apparatus 100 may involve the use of at least one source 2010 configured to deliver EM energy to the energy application zone. By way of example, and as illustrated in FIG. 1, the source may include one or more of an RF power supply 2012 configured to generate EM waves (also referred to herein as AC waveforms) that carry EM energy. For example, power supply 2012 may be a magnetron configured to generate high power microwave waves at a predetermined wavelength or frequency. Alternatively, power supply 2012 may include a semiconductor oscillator, such as a voltage controlled oscillator, configured to generate AC waveforms (e.g., AC voltage or current) with a constant or varying frequency. Forms of EM waves may include sinusoidal waves, square waves, pulsed waves, triangular waves, or another type of waveforms with alternating polarities. Alternatively, a source of EM energy may include any other power supply, such as EM field generator, EM flux generator, or any mechanism for generating vibrating electrons.

In some embodiments, apparatus 100 may include a phase modulator (e.g., modulator 2014) that may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation such phase modulation based on feedback from the energy application zone. For example, processor 2030 may be configured to receive an analog or digital feedback signal from detector 2040, indicating an amount of EM energy received from zone 9 at a first time period, and processor 2030 may dynamically determine a time delay at the phase modulator for a later (e.g., following) time period based on the received feedback signal.

In some embodiments, apparatus 100 may include a frequency modulator (e.g., modulator 2014). The frequency modulator may include a semiconductor oscillator configured to generate an AC waveform oscillating at a predetermined frequency. The predetermined frequency may be in association with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (which may form part of RF power source 2012) to sequentially generate AC waveforms oscillating at various frequencies within one or more predetermined frequency bands. In some embodiments, a predetermined frequency band may include a working frequency band, and the processor may be configured to cause the transmission of energy at frequencies within a sub-portion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, each frequency may be associated with a feeding scheme (e.g., a particular selection of phases). In some embodiments, based on the feedback signal provided by detector 2040, processor 2030 may be configured to select one or more frequencies from a frequency band, and regulate an oscillator to sequentially generate AC waveforms at these selected frequencies.

Alternatively or additionally, processor 2030 may be further configured to regulate amplifier 2016 to adjust amounts of energy supplied to radiating elements 2018, based on the feedback signal. Consistent with some embodiments, detector 2040 may detect an amount of energy reflected from the energy application zone and/or energy applied at a particular frequency, and processor 2030 may be configured to cause the amount of energy supplied at that frequency to be low when the reflected energy and/or emitted energy is low. Additionally or alternatively, processor 2030 may be configured to cause one or more radiating elements to deliver energy at a particular frequency over a short duration when the reflected energy is low at that frequency.

In some embodiments, the apparatus may include more than one source of EM energy, and/or more than one energy application unit as discussed in the context of FIG. 2. For example, more than one oscillator may be used for generating AC waveforms of differing frequencies. The separately generated AC waveforms may be amplified by one or more amplifiers. Accordingly, at any given time, radiating elements 2018 may be caused to simultaneously emit EM waves at, for example, two differing frequencies to zone 9.

Processor 2030 may be configured to regulate the phase modulator in order to alter a phase difference between two EM waves supplied to the energy application zone. In some embodiments, source 2010 may be configured to supply EM energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within zone 9, delaying the phase of an AC waveform anywhere from between 0-360 degrees.

In some embodiments, a splitter (not illustrated) may be provided in apparatus 100 to split an AC signal, for example generated by an oscillator, into two AC split signals. Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal.

The processor may be configured to regulate an amplitude modulator in order to alter an amplitude of at least one EM wave supplied to the energy application zone. In some embodiments, the source of EM energy may be configured to supply EM energy in a plurality of amplitudes, and the processor may be configured to cause the transmission of energy at a subset of the plurality of amplitudes. In some embodiments, the apparatus may be configured to supply EM energy through a plurality of radiating elements, and the processor may be configured to supply energy with differing amplitudes simultaneously to two or more radiating elements.

Although FIG. 1 illustrates a circuit including two radiating elements 2018, it should be noted that any number of radiating elements may be employed, and the processor may select combinations of excitation setups through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more excitation setups.

Figure 3:
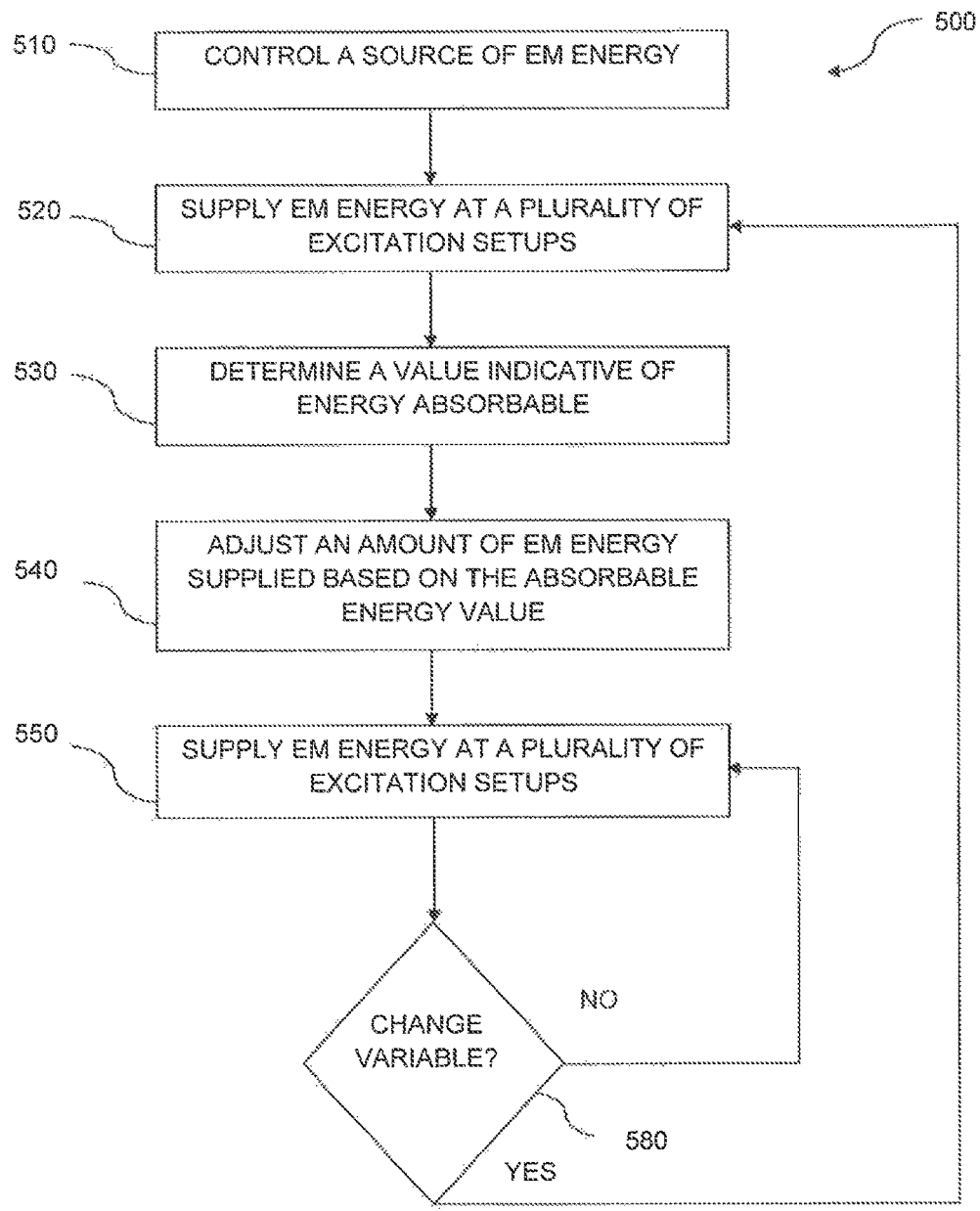
FIG. 3 is a flow chart of a method for applying EM energy to an energy application zone in accordance with some embodiments of the present invention.

FIG. 3 represents a method for applying EM energy to an object in accordance with some embodiments of the present invention. EM energy may be applied to an object, for example, through at least one processor implementing a series of steps of method 500 of FIG. 3.

In certain embodiments, method 500 may involve controlling a source of EM energy (step 510). A "source" of EM energy may include any components that are suitable for generating EM energy. By way of example only, in step 510, the at least one processor may be configured to control energy application unit 210 and/or 260 (shown in FIG. 2) and/or RF energy source 2010 (shown in FIG. 1).

The source may be controlled to supply EM energy at a plurality of excitation setups (e.g., at a plurality of frequencies and/or phases and/or amplitudes etc.) to at least one radiating element, as indicated in step 520. Various examples of excitation setup supply, including sweeping, as discussed earlier, may be implemented in step 520. Alternatively or additionally, other schemes for controlling the source may be implemented so long as that scheme results in the supply of energy at a plurality of excitation setups. The at least one processor may regulate source 2010 to supply energy at multiple excitation setups to at least one emitting radiating element (e.g., 2018).

In certain embodiments, the method may further involve determining a value indicative of energy absorbable by the object at each of the plurality of excitation setups, in step 530. An absorbable energy value may include any indicator—whether calculated, measured, derived, estimated or predetermined—of an object's capacity to absorb energy. For example, processor 2030 may be configured to determine an absorbable energy value, such as a dissipation ratio associated with each excitation setup.

In certain embodiments, the method may also involve adjusting an amount of EM energy incident or applied at each of the plurality of excitation setups based on the absorbable energy value at each excitation setup (step 540). For example, in step 540, at least one processor may determine an amount of energy to be applied at each excitation setup, as a function of the absorbable energy value associated with that excitation setup.

In some embodiments, a choice may be made not to use all possible excitation setups. For example, a choice may be made not to use all possible frequencies in a working band, such that the emitted frequencies are limited to a sub band of frequencies, for example, where the Q factor in that sub band is smaller or higher than a threshold. Such a sub band may be, for example 50 MHz wide 100 MHz wide, 150 MHz wide, or even 200 MHz wide or more.

In some embodiments, the at least one processor may determine a weight, e.g., power level, used for supplying the determined amount of energy at each excitation setup, as a function of the absorbable energy value. For example, amplification ratio of amplifier 2016 may be changed inversely with the energy absorption characteristic of object 11 at each excitation setup. In some embodiments, when the amplification ratio is changed (e.g. inversely with the energy absorption characteristic), energy may be supplied for a constant amount of time at each excitation setup. Alternatively or additionally, the at least one processor may determine varying durations at which the energy is supplied at each excitation setup. For example, the duration and power may vary from one excitation setup to another, such that their product correlates (e.g. inversely) with the absorption characteristics of the object. In some embodiments, the controller may use the maximum available power at each excitation setup, which may vary between excitation setups. This variation may be taken into account when determining the respective durations at which the energy is supplied at maximum power at each excitation setup. In some embodiments, the at least one processor may determine both the power level and time duration for supplying the energy at each excitation setup.

In certain embodiments, the method may also involve supplying EM energy at a plurality of excitation setups (step 550). Respective weights are optionally assigned to each of the excitation setups to be emitted (step 540) for example based on the absorbable energy value (as discussed above). EM energy may be supplied to zone 9 via radiating elements, e.g., radiating elements 2018.

If in step 580, it is determined if variables should be changed and reset in step. If not (step 580: no), the process may return to step 550 to continue application of EM energy. Otherwise (step 580: yes), the process may return to step 520 to determine new variables. For example, after a time has lapsed, the object properties may have changed; which may or may not be related to the EM energy application. Such changes may include temperature change, translation of the object (e.g., if placed on a moving conveyor belt or on a rotating plate), change in shape (e.g., mixing, melting or deformation for any reason) or volume change (e.g., shrinkage or puffing) or water content change (e.g., drying), flow rate, change in phase of matter, chemical modification, etc. Therefore, at times it may be desirable to change the variables of energy application, for example, in response to these or other changes. The new variables that may be determined may include, for example: a new set of excitation setups, an amount of EM energy to be applied at each of the plurality of excitation setups, weight, e.g., power level, of the excitation setup(s) and duration at which the energy is supplied at each excitation setup. Consistent with some of the presently disclosed embodiments, less excitation setups may be swept in step 520 performed during the energy application phase than those swept in step 520 performed before the energy application phase, such that the energy application process is interrupted for a minimum amount of time.

The present invention is not limited to method 500 for applying EM energy to an object. Within the scope of the invention, alternative methods might be used for accomplishing the functions described herein, as would be understood by a person of ordinary skill in the art, reading this disclosure.

Figure 4:
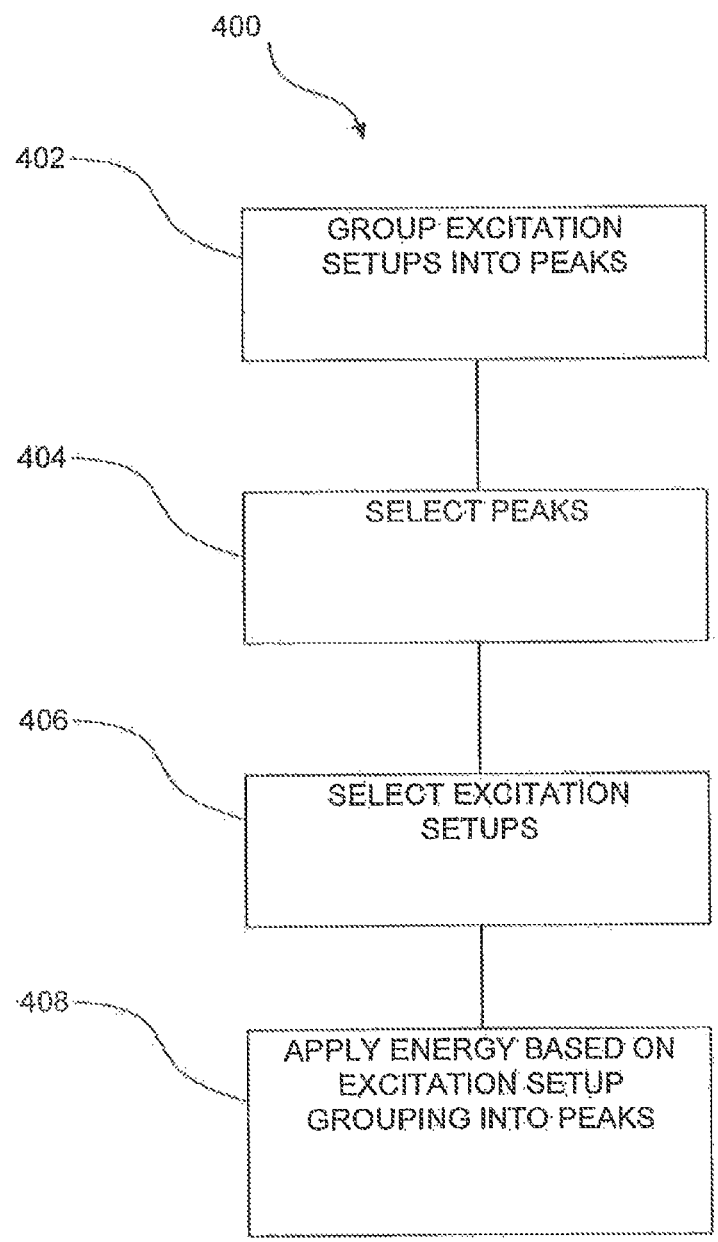
FIG. 4 is a flowchart of a method of processing an object according to some embodiments of the invention.
Figure 5A:
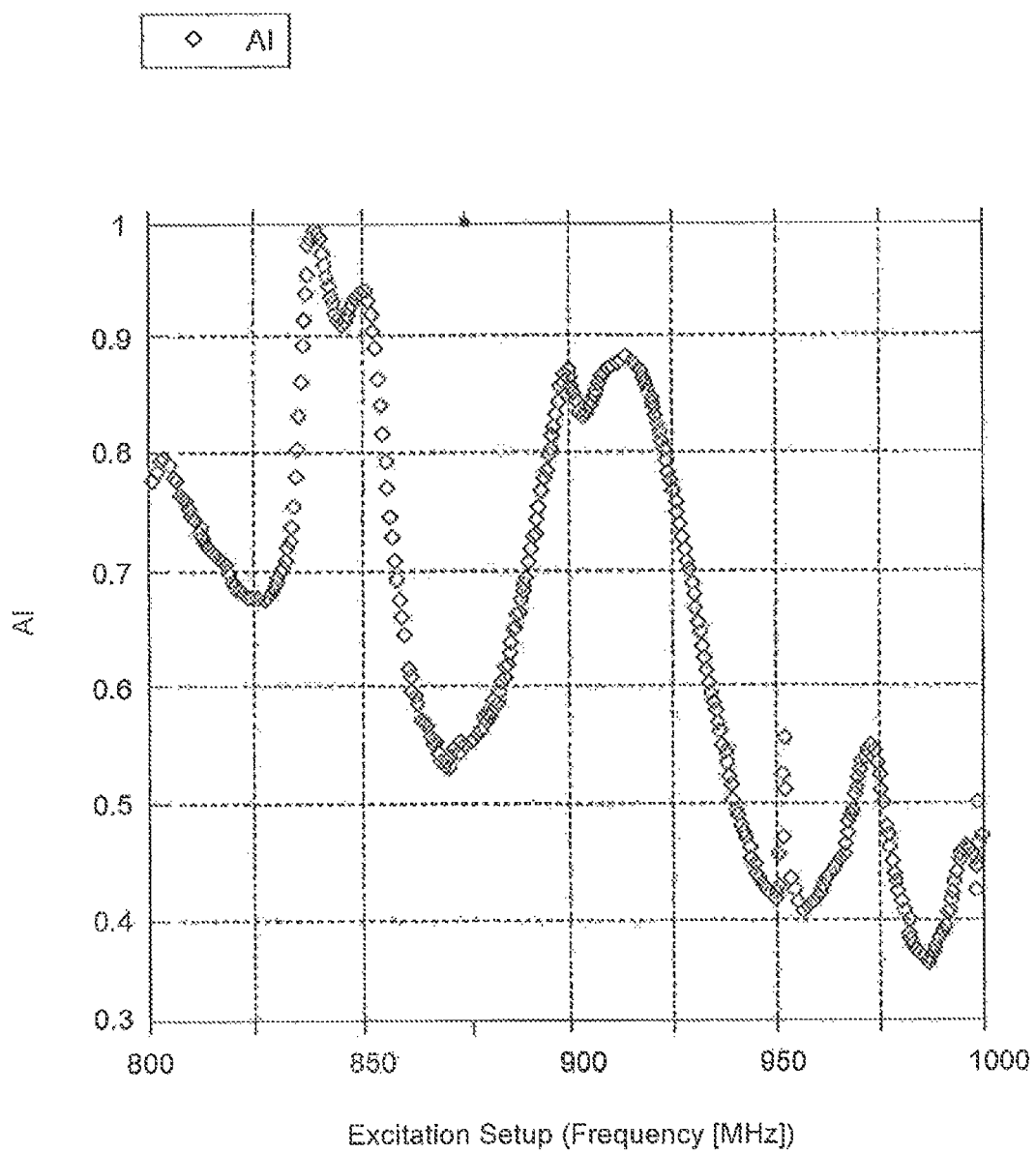
FIGS. 5A and 5B are graphical representations of exemplary associations between values indicative of energy absorbed in an energy application zone with the excitation setups at which the values were measured.

FIG. 4 is a flowchart showing steps that may be included in a method 400 of processing an object according to some embodiments of the invention. Method 400 may include step 402, in which groups of excitation setups corresponding to peaks (discussed below) may be selected; and a step (408) in which energy may be applied according to the selection. Selecting a group of excitation setups may also be referred to herein as grouping the excitation setups. To illustrate how excitation setups may be grouped into peaks, reference is made to FIG. 5A, which is a graph showing dependence of values indicative of energy absorption in an energy application zone housing an object on the excitation setups at which these values were measured. In some embodiments, each of a plurality of excitation setups may be associated with one or more values of AIs measured at the same excitation setup, for example, each frequency may be associated with S parameters measured at that frequency. In FIG. 5A, the excitation setups were one-dimensional, and were defined by frequency value alone. In case of multi-dimensional excitation setups, other presentations may be used, for example, graphs similar to that presented in FIG. 5A may be compiled to show the dependence of the values indicative of absorbable energy on values of one c-FAP when the values of the other c-FAPs are constant. For example, the dependency of an AI may be shown as a function of frequency for each phase relationship, as exemplified in FIG. 5B.

As used herein, the term "peak" may correspond to a group of excitation setups that together exhibit a maximum (global or local) on an AI vs. excitation setup curve. The maximum in AI may be, for example, defined with respect to a threshold AI value, and the group of excitation setups may correspond to those excitation setups exhibiting an AI value above the threshold and that together provide the local or global maxima in the AI vs. excitation setup curve. FIG. 5A, which plots AI on the y-axis vs. excitation setup frequency (a potential c-FAP in an excitation setup) on the x-axis, illustrates this concept. For example, if the threshold AI value is 0.9, a single peak may be identified encompassing the excitation setups having frequencies in the range between 836 MHz and 852 MHz. On the other hand, if the threshold is, instead, 0.8, two peaks may be identified. The first peak encompasses excitation setups having frequencies in the range between 833 MHz and 855 MHz. The second peak encompasses excitation setups having frequencies in the range between 895 MHz and 923 MHz.

In some embodiments, a peak may be defined as a group of neighboring excitation setups having a single local maximum. Neighborhood may be along a c-FAP. In these embodiments, the above-mentioned first peak (833-855 MHz) may include two peaks, for example, one between 833 MHz and 843 MHz, and the other between 843.5 MHz and 855 MHz. In some embodiments, a peak may not include any local minimum. Methods known in the art may be applied to identify the peaks. Such methods may include routines to define extreme points in digitized, noisy data.

In some embodiments, a peak may be identified as a point where the derivative of the AI changes sign from positive to negative. To distinguish a peak from noise, a certain notability threshold may be predetermined. The notability may be a ratio between the AI value at the peak and the AI value at the local minimum (also referred to herein as a shoulder) nearest to the peak. Peaks wherein this ratio is smaller than a predetermined threshold may be discarded or ignored. For example, in FIG. 5A, the AI value at the local maximum in the above-mentioned first peak (at about 837 MHz) is 1, and it is between two shoulders: a low shoulder at about 825 MHz (where the AI is about 0.68), and a high shoulder, at about 847 MHz, wherein the AI is about 0.9. In some embodiments, a notability value may be defined as the ratio between the AI value at the maximum and the AI value at the higher shoulder, which in the case of the above-discussed first peak is 1/0.9=1.11. In some embodiments, peaks having a notability value below a threshold are ignored and not considered as peaks. In some embodiments, peaks may be ordered by notability value, and the 50% (or any other predetermined portion) having the lowest notability values may be ignored. In some embodiments, energy application may be controlled based on the notability value, for example, more energy may be applied to excitation setups of more notable peaks than to excitation setups of less notable peaks.

In some embodiments, the method may further include selecting peaks out of all the identified peaks. For example, in some embodiments, peaks may be selected based on their notability, as explained above. In some embodiments, peaks may be selected based on their width (e.g., distance along the c-FAP between the two minima around them, width at half the maximum, or any other definition of peak width). For example, in some embodiments, only peaks having width at a predetermined range (e.g., wider than 1 MHz and narrower than 5 MHz) may be selected. In another example, peaks having a relative width within a predetermined range may be selected (e.g., peaks wider than 0.1% of the central frequency and narrower than 0.5% of the central frequency). In some embodiments, peaks may be selected based on their quality factor (also referred to as Q factor). The Q factor may be defined as a ratio between the frequency at which the peak has its maximum and the peak width along the frequency c-FAP. In some embodiments, a similar parameter may be determined along another c-FAP (e.g., the ratio between the phase at which the AI has a maximum, and the width of the peak along the phase c-FAP). In some embodiments, one or more Q factor thresholds may be defined, and peaks may be selected according thereto. For example, peaks may be selected only if their Q factors lie between two thresholds, only above a threshold, or only below a threshold, depending on the specific application. Some exemplary values of thresholds may be 2, 5, 10, and 100. Thus, in some embodiments, only peaks with Q factors between 5 and 10 are selected; in some embodiments only Q factors above 100 may be selected; in some embodiments only peaks with Q factor below 100 and above 10; etc. In some embodiments, peaks may be selected according to relations between them and other peaks. For example, in some embodiments, the selected peaks may be all the 20% of the peaks having the highest AI values. In this example, if 100 peaks are identified, for example, only the 20 peaks having the highest AI value may be selected. In some embodiments, only the peaks of largest width, smallest width, width around the median, etc., may be selected. In some embodiments, peaks may be selected based on their separation distance from other peaks. For example, the 10 most widely separated peaks (e.g., peaks having the largest separation distance, in terms of spacing along the frequency axis, from their nearest neighbor peak) may be selected. In some embodiments, peaks may be selected based on their symmetry. The symmetry may be defined by terms of the degree of correspondence between parts of the peak on either side of its maximum. For example, only peaks wherein the distance between the two local minima around them is the same (within a given tolerance) may be selected. In another example, peaks may be selected according to differences (or similarities) between the distance (in, say, MHz) between the frequency at the maximum and the frequency at half the maximum at each of the maximum's sides. In some embodiments, only peaks having a symmetry below some degree (for example, peaks having an average slopes that differ by at least a minimal predetermined extent from each other), may be selected. While these examples for identifying or selecting peaks have been described in terms of a frequency c-FAP, similar principles may be applied also along other c-FAPs, for example along a phase c-FAP. Also, in some embodiments, peaks may be selected by more than one criterion, for example, peaks may be selected if they have both a Q factor in some predetermined range and separation within some predetermined range, etc.

In step 408, energy may be applied at various excitation setups according to the grouping of the excitation setups into peaks and/or according to the selection. For example, in some embodiments, energy may be applied such that substantially the same amount of energy is absorbed by each selected peak. Two amounts may be considered substantially the same if they differ by less than 10%, for example, by 5% or less. An amount of energy may be said to be absorbed by a peak if it is absorbed collectively at all the excitation setups of the peak. For example, in a graph showing absorbed energy as function of excitation setup, the absorbed energy associated with a peak may be the area under that portion of the graph that represents the peak. In some embodiments, the amount of energy absorbed by a peak may be equated with the sum of the multiplicative products of the absorbability indicator value associated with each of the peak's excitation setups by the amount of energy applied at the respective excitation setup as summarized in the following equation:

$$B_{abs}^{peak} = \sum_{j=1}^{n} AI_j \times I_j$$

Wherein $B_{abs}^{peak}$ is the amount of energy absorbed in the peak, j is an index of excitation setups members of the peak, n is the number of excitation setups members of the peak, $AI_j$ is the AI value associated with excitation setup having the index j, and $I_j$ is the amount of incident energy supplied to the radiating element(s) at excitation setup j. Here, and everywhere else in this application, energy considerations may be replaced by power considerations. For example, peaks may be selected according to the amount of power they absorb, which may be given by the equation:

$$P_{abs}^{Peak} = \sum_{j=1}^{n} AI_j \times P_j^{incident}$$

Wherein $P_{abs}^{peak}$ the amount of power absorbed in the peak, j is an index of excitation setups members of the peak, n is the number of excitation setups members of the peak, $AI_j$ is the AI value associated with excitation setup having the index j, and $P_j^{incident}$ is the amount of incident power supplied to the radiating element(s) at excitation setup j.

In some embodiments, the amount of energy absorbed by a peak may be equated with the multiplicative product of the average AI value by the average input energy inputted into excitation setups of the peak, for example, as summarized in the following equation:

$$E_{abs}^{Peak} = \frac{1}{n}\sum_{j=1}^{n} AI_j \times \frac{1}{n}\sum_{j=1}^{n} I_j$$

In the latter example, if the same amount of energy (I) is applied at each excitation setup of the peak, the equation for $E_{abs}^{peak}$ may be $$E_{abs}^{Peak} = \frac{1}{n}\sum_{j=1}^{n} AI_j \times I$$

In some embodiments, energy may be applied such that the same amount of energy is absorbed at each excitation setup of a given peak. For example, an amount of energy to be absorbed in a peak may be determined, and divided to a number of equal quanta. The number of quanta may be equal to (or larger than) the number of excitation setups in the peak. Applying energy may be designed such that each energy quantum is absorbed in a different excitation setup of the peak. For example, the amount of energy applied at each excitation setup may be equal to the quantum of energy multiplied by an AI value associated with the respective excitation setup.

Method 400 may further include step 404, in which two or more of the peaks are selected based on one or more selection criterions. For example, in some embodiments, peaks may be selected based on AI values associated with the excitation setups included in the peaks. For example, only peaks having a maximal AI value above a predetermined threshold may be selected. In another example, only a predetermined portion of the peaks, having the highest maximum AI values may be selected. Additionally, peaks may be selected based on the relative AI values associated with excitation setups included in the peak. For example, peaks that include excitation setups associated with AI values higher than a threshold may be selected. In some embodiments, an excitation setup having the highest AI value from among the excitation setups within a particular peak may be selected.

In some embodiments, peaks may be selected based on their width. For example, in some embodiments, only peaks having a width larger than a threshold (e.g., larger than 10 MHz, 20 MHz, or 50 MHz) may be selected. In some embodiments, the width may be expressed as a unit-less ratio between the width of the peak and a normalization factor. A value of a central frequency (or any other c-FAP value along which the peak is defined) of the peak may serve as an example to a normalization factor. In such a case, peaks may be selected based on a ratio between their width and their central frequencies. In some embodiments, the width and/or normalizing factor may be values of c-FAPs other than frequency, for example, a peak may be a group of excitation setups all having a common frequency, and having AI values comprising one local maximum and no local minimum and different phase differences. The breadth of such peak may be the difference between the smallest and largest phase difference values in the peak, divided by the phase value of the central excitation setup in the peak.

In some embodiments, peaks may be selected based on a separation between them and other peaks. For example, in some embodiments, a peak may be selected if the separation between its central frequency and the central frequency of the nearest peak is more than a threshold, for example, more than a predetermined number of MHz, more than a predetermined percentage of the central frequency of the peak, and/or more than a predetermined percentage of the breadth of the peak.

In another example, only the 20% (or any other portion) of the peaks having the highest AI value (or the highest value of another parameter serving as a selection criterion) may be selected. For example, if 100 peaks were identified only those 20 associated with the highest AI values may be selected.

In some embodiments, peaks may be selected based on whether a characterizing parameter (e.g., highest AI value associated with an ESU of the peak, width of a peak, separation of a peak, etc.) is within a predetermined range. The range may be defined by absolute thresholds (e.g., within a given range of MHz, within a given range of DR values, within a given range of width to height ratio, within a given range of width to central c-FAP value, etc.).

In some embodiments, peaks may be selected based on a relative characterizing feature. Selection based on such a relative feature may include, for example, selecting 10% of the peaks having the highest value, the lowest value, or values within some given percentile range. For example, in some embodiments, only the 20% of the peaks having the highest AI values may be selected. In some embodiments, only the peaks having breadth in percentiles 40-60 may be selected, etc.

In some embodiments, peaks may be selected based on an area defined by the peak. For example, a peak selection criterion may depend on an area defined by the X axis and extrapolation of the peak borders. In some embodiments, the selection criterion may depend on a multiplicative product of the peak width and height. In some embodiments, the selection criterion may include two thresholds. For example, in some embodiments, each selected peak has a height above a height threshold and a width above a width threshold.

In some embodiments, the selection criterion may include a range, such that only peaks, a characteristic thereof fall within the range, are selected. For example, the peak selection criterion may be that only peaks, the maximum thereof is associated with DR values of between 0.6 and 0.9 are selected.

Figure 5B:
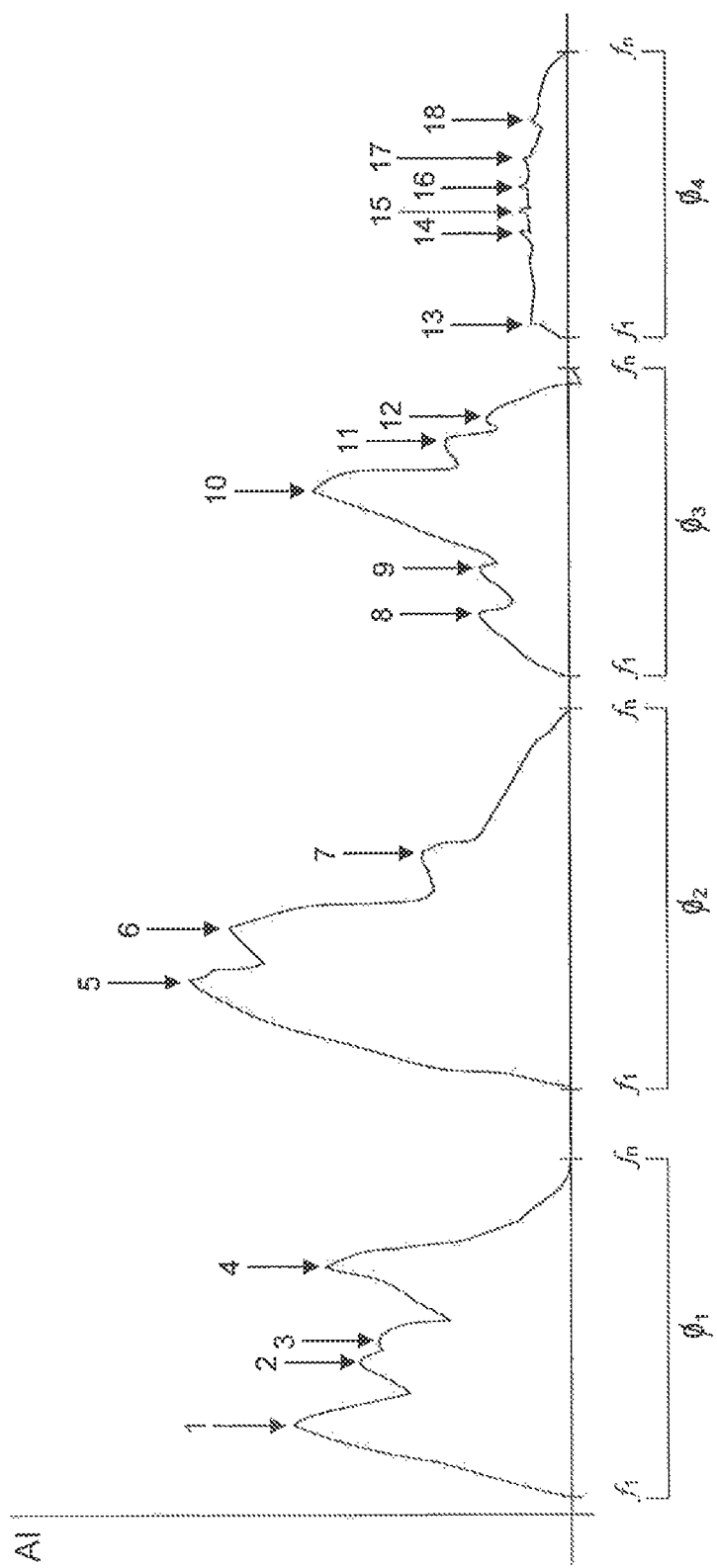

In some embodiments, the selection may be in accordance with the value of a selection criterion among all the peaks together (referred to herein as global selection) or separately among differing groups of peaks. For example, the excitation setups may be determined by frequency and phase-difference values, and the peaks may be defined along a frequency axis. A predetermined portion of the peaks (e.g., 10%, 25%, 50%, etc.) may be selected, irrespective of the phase difference of each excitation setup. Alternatively, a predetermined portion of the peaks detected at each of the phase difference values separately may be selected (referred herein as local selection). The difference is illustrated in FIG. 5B, which is a graph illustrating a paper example of frequency dependence of an AI value at differing phase relations. The frequencies run between f1 and fn; and the phase relations are Φ1, Φ2, Φ3, and Φ4. Each peak is numbered, from 1 to 18. In some embodiments, half of the peaks are to be selected based on their AI value. If the selection is global, none of peaks 13 to 18 may be selected. If the selection is local, half of these peaks will be selected, as well as half of peaks 1-4, half of peaks 5-7, and half of peaks 8-12.

In some embodiments, there may be a minimal number of peaks to be selected (globally and/or locally). For example, a minimal number of peaks may be selected, and only if the predetermined portion of the number of peaks is larger than the minimal number, additional peaks are selected. In some embodiments, there may be a maximal number of peaks to be selected (globally and/or locally). For example, a predetermined portion of the peaks may be selected, and if larger than the predetermined maximum, peaks may be de-selected based on the selection criterion. For example, if the predetermined portion is 10% and the maximal number is 5, and 60 peaks exist, the peaks may be ordered by their selection criterion, and only the first 5 may be selected, or the first 6 may be selected and then the 6$^{th}$ may be de-selected to abide with the maximal number requirement.

In some embodiments, peaks may be selected based on resonance character assigned to them and/or to a frequency of an excitation setup included in them.

Figure 6:
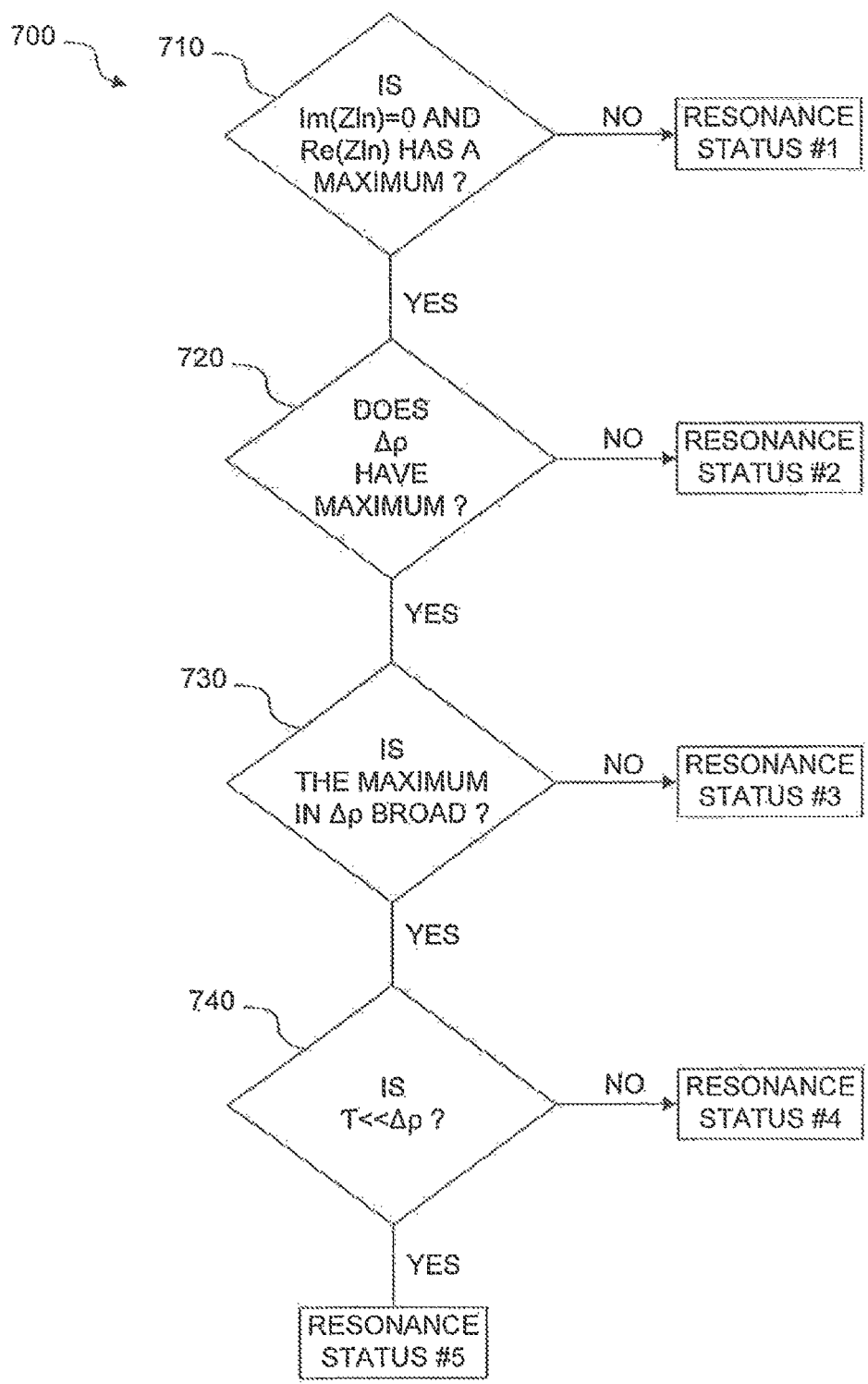
FIG. 6 is a flowchart of steps included in a method of determining the resonance character of a frequency according to some embodiments of the invention.

FIG. 6 is a flowchart of a method 700 of determining the resonance character (also referred to as resonance status) of a frequency (f) according to some embodiments of the invention. Without being bound by theory, it is suggested that the resonance statuses as determined by method 700 may correspond to resonances of different physical character or sources. However, the use of the resonance status as a peak selection criterion does not have to depend on such correspondence.

In some embodiments depicted in FIG. 6, determining the resonance character of a frequency (f) may involve analyzing an input impedance of the radiating elements over a plurality of frequencies. At step 710, a decision may be made regarding whether the imaginary part of the input impedance of a radiating element is 0 (zero), and if the real part has a maximum. In some embodiments, these determinations may be made with some tolerance, for instance the decision if $Im(Z_{in})$ is zero may be positive if the absolute value of the $Im(Z_{in})$ is smaller than a threshold, for example (e.g., 0.05). Similarly, the decision if Re(Zin) has a maximum at frequency (f) may be positive if the maximum is within some frequency interval around (f).

If $Im(Z_{in})$ is not zero or $Re(Z_{in})$ is not a maximum (710: NO), the resonance status of frequency f may be determined to be status #1. In some embodiments, status #1 may correspond to an "off-resonance" frequency. Additionally, or alternatively, frequencies classified as having this resonance status by method 700 may be further be classified by another method, not shown, as may be appropriate for the specific embodiment. If $Im(Z_{in})$ is zero and $Re(Z_{in})$ is at a maximum (either local or global) (710: YES), the method may proceed with step 720.

At step 720, a decision may be made if the frequency may be associated with an absorption peak (e.g., with a local maximum of Δρ vs. frequency). If not, the frequency may be considered to have a "#2" resonance character. In some embodiments, a frequency having a resonance status #2 may be identified as a non-resonance frequency.

In some embodiments, a resonance frequency may be defined as any frequency that yielded a "yes" in step 720. In some embodiments, the method may stop after step 720 yields this determination. In the depicted embodiment, however, the method continues to step 730.

At step 730 a decision may be made if the absorption maximum associated with the frequency (f) is broader than a threshold (e.g., breadth at half maximum larger than a predetermined value, or ratio between breadth at half maximum and peak height larger than some threshold value). If not (730: NO), the frequency may be assigned a resonance status #3. In some embodiments, a resonance status #3 may be associated with frequencies that resonate mainly in accessories inside the cavity, for example, with a tray, a rack, etc. If the absorption peak is broader than the threshold (730: Yes); the method may continue to step 740.

In step 740, a decision may be made if the transfer parameter τ is smaller than Δρ. The transfer coefficient τ may be defined as $$\tau = \frac{p_{cp}}{p_{in} = p_\tau}.$$

If the condition is fulfilled (740: YES) the frequency (f) may be assigned resonance status #5; otherwise (740: NO), the frequency (f) may be assigned resonance status #4. In some embodiments, frequencies assigned resonance status #4 may be identified as resonating with the cavity and the object, while frequencies assigned resonance status #5 may be identified as resonating mainly with the object.

In some embodiments, other decisions may be taken for assigning resonance character to frequencies. For example, in some embodiments, the determination or decision (herein the terms "decision" and "determination" may be used interchangeably) if the imaginary part of the input impedance is zero (in step 710) may be replaced with the determination or decision whether or not it has a discontinuity, and the other steps may be as depicted in FIG. 6.

A discontinuity in the imaginary part of the input impedance (Im $(Z_{in})$) may exist where Im $(Z_{in})$ includes two non-overlapping portions, one convex downward and the other convex upwards, wherein the highest value of the convex downwards portion and the lowest value of the convex upwards portion are at adjacent or nearly adjacent frequencies. A graph portion is said to be convex downwards if the graph portion lies below any line segment joining any two points of the graph portion. Similarly, a graph portion is said to be convex upwards if the graph portion lies above any line segment joining any two points of the graph portion.

Figure 8:
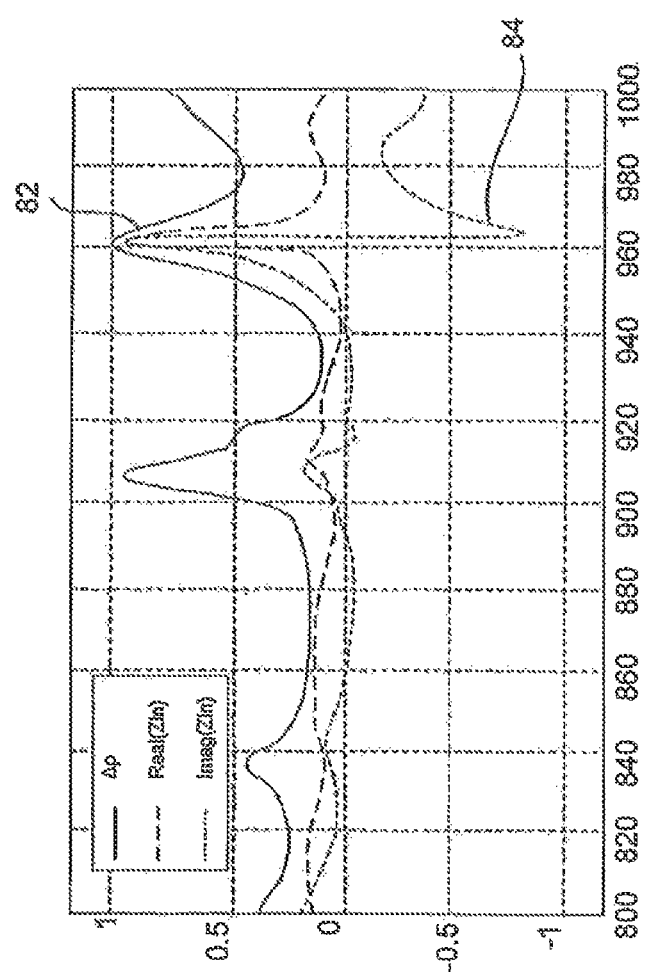
FIG. 8 is a graphical representation of experimental results obtained during RF heating of an object in an RF oven having two radiating elements.

A discontinuity in Im($Z_{in}$) may be observed in FIG. 8, at about 960 MHz, where from about 920 to about 960 MHz the graph is convex upwards (to about the point marked 82) and from about 965 MHz (from the point marked 84) to about 990 MHz the graph is convex downwards. As may be seen in FIG. 8, a discontinuity may appear as a straight line connecting the upwardly convex with the downwardly convex portions (in the graph of FIG. 8, the line connecting points 82 and 84).

Figure 7:
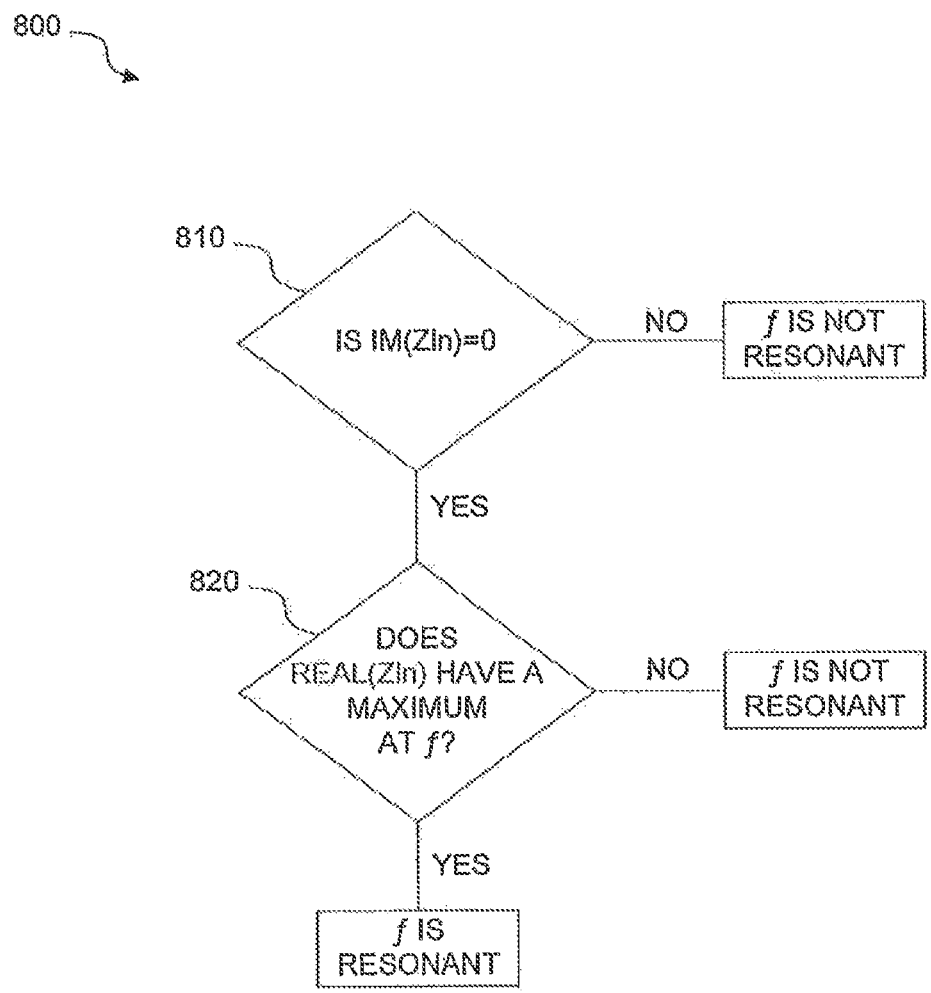
FIG. 7 is a flowchart of a method of determining resonance character of a frequency according to some embodiments of the invention.

FIG. 7 is a flowchart of a method 800 of determining the resonance character (also referred to as "resonance status") of a frequency (f) according to some embodiments of the invention. In some embodiments represented by FIG. 7, determining the resonance character of a frequency (f) may involve analyzing an input impedance of the radiating elements over a plurality of frequencies. For example, at step 810, a decision may be made regarding whether the imaginary part of the input impedance of a radiating element is 0 (zero). In some embodiments, this determination may be made within some tolerance. For instance, the decision may be positive (i.e., yes) if the absolute value of the Im($Z_{in}$) is smaller than a threshold, for example, smaller than 0.05.

If Im($Z_{in}$) is not zero (810: NO), the resonance status of frequency f may be determined to be "non-resonant" or f may be determined as an "off-resonance" frequency. If, on the other hand, Im($Z_{in}$) is zero (810: YES), the method may proceed with step 820.

At step 820, a decision may be made if the real part of the input impedance has a local maximum at frequency f. In some embodiments, this determination may be made within some tolerance. For instance, the decision may be positive (yes) if a frequency difference between the frequency at which Im($Z_{in}$) is zero and the frequency at which Real ($Z_{in}$) has a maximum is smaller than some threshold. If so, (820: YES), the resonance character of frequency f may be determined to be "resonant" or f may be determined to be an "in-resonance" frequency. Otherwise, (820: NO), frequency f may be determined to have a "non-resonant" status, and the characterization of the resonance character of frequency f may be finished.

In some embodiments, a resonance frequency may be defined as a frequency identified by method 700 or by method 800 as a resonant frequency or as an "in-resonance" frequency.

FIG. 8 is a graphical representation of experimental results, obtained during RF heating of eight frozen chicken breasts in an RF oven having two radiating elements. The figure shows measurement results of the real and imaginary parts of $Z_{in}$ and of Δρ (dashed, dotted, and full lines, respectively) over an 800-1000 MHz frequency band. In this graph, Zin has been normalized. The dissipation ratio (Δρ) shown represents the dissipation ratio for one of the two radiating elements present. The graph of Δρ shows three main absorption peaks: one at about 838 MHz, another at about 910 MHz, and a third at about 960 MHz. Each of these peaks may constitute a candidate for a resonance peak.

At 838 MHz (the location of the first peak), Im($Z_{in}$) is not equal to 0 (see dotted line) and Real ($Z_{in}$) does not exhibit a local maximum (see dashed line). Therefore, the frequencies at and around 838 MHz may be considered as resonance status #1 (by method 700) or non-resonant (by method 800).

The second and third peaks, however, are associated with frequencies where ($Z_{in}$)=0 and Real ($Z_{in}$) exhibits a local maximum. Thus, the frequencies at and around 910 MHz and 960 MHz may be considered as resonance status #1 (by method 700) or resonant frequencies (by method 800).

In some embodiments, energy may be applied only at excitation setups of selected peaks. In some embodiments, two or more peaks may be selected based on different peak selection criterions. For example, a first peak may be selected based on a first criterion (e.g., because the peak is associated with a resonant frequency), and a second peak may be selected based on a second criterion (for example, being non-resonant and broad). In some embodiments, energy may be applied to peaks according to different rules, based on the selection criterions that lead to the selection of the peaks. For example, energy may be applied such that a first amount of energy may be absorbed by each peak selected based on a first selection criterion, and a second amount of energy may be absorbed by each peak selected based on a second selection criterion.

In some embodiments, energy is not applied at excitation setups of non-selected peaks. In some embodiments, energy is applied only at excitation setups of selected peaks.

Method 400 may further include step 406, in which excitation setups are selected for energy application. For example, in some embodiments, a specified number (e.g., 1, 2, 10, etc.) of excitation setups are selected from each peak, and energy is applied only at the selected excitation setups. The number of excitation setups selected from each peak may vary. For example, in some embodiments, a half, third, or another portion of the excitation setups of each peak may be selected. In some embodiments, excitation setups may be selected only from selected peaks. In such embodiments, the selection of excitation setups (e.g., the number of the selected excitation setups, or any other characteristic thereof used for their selection) may be based on the selection criteria according to which the peak was selected. For example, a single excitation setup may be selected from each peak selected based on a first selection criterion. Among the excitation setups of peaks that were selected according to another peak selection criterion, a different number of excitation setups (e.g., all the excitation setups of the peak) may be selected for energy application. In some embodiments, only excitation setups associated with an AI value higher than a threshold are selected. This threshold may be the same for all peaks. In some embodiments, this threshold may vary between peaks. For example, the threshold value may be 90% of the maximal value associated to any excitation setup of the peak.

In some embodiments, energy may be applied only at the selected excitation setups. Thus, proper selection of excitation setups may lead to energy application only at excitation setups that are most efficiently absorbed. Another selection rule may facilitate maximal spread of energy application over a plurality of excitation setups.

In some embodiments, an amount of energy may be determined to be absorbed by a peak, and this amount of energy may be distributed equally between the selected excitation setups such that each excitation setup absorbs the same portion of the amount of energy. In some embodiments, the amount of energy may be distributed between the selected excitation setups such that the same amount of energy, the same power, and/or the same energy application duration is used in applying energy at each of the selected excitation setups.

In some embodiments, selecting excitation setups may include selecting according to values of an absorbability indicator associated with each of the excitation setups. For example, in some embodiments, only the excitation setups associated with the higher values of absorbability indicators may be selected, or the amount of energy applied at each selected excitation setup may be related (e.g., directly, inversely, or by any other relation to the AI value associated with the selected excitation setup).

Figure 9:
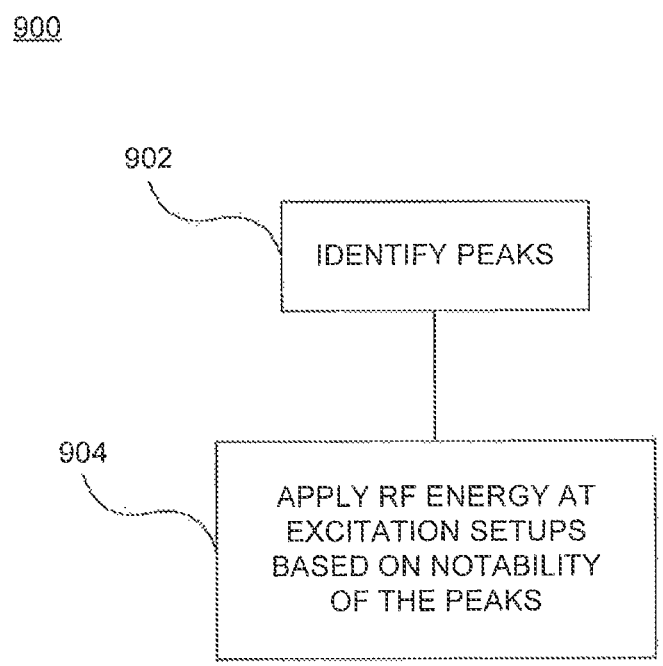
FIG. 9 is a flowchart of a method for applying RF energy to a cavity according to some embodiments of the invention.

FIG. 9 is a block diagram of method 900 for applying RF energy to a cavity. The cavity may include an object to be heated by the RF energy. Method 900 may include step 902, in which peaks are identified. Peak identification may include grouping of excitation setups according to the values of an absorbability indicator associated with them. For example, the identification may include associating excitation setups to peaks as discussed in the context of FIG. 5A. One or more of the identified peaks, and in some embodiments, each of the identified peaks may have a maximum and a shoulder. The maximum may be the highest value the AI has among all the excitation setups grouped together under a single peak. The shoulder may be the smallest AI associated with an excitation setup belonging to the peak. In some embodiments, a peak is defined between two local minimums, and the shoulder may be the local minimum at which the AI value is higher. Each peak may be associated with a notability value, which is a ratio between a value of an absorbability indicator at the maximum and a value of the absorbability indicator at the shoulder.

Method 900 may further include a step 904 of applying RF energy at excitation setups belonging to the peaks based on notability values of the corresponding peaks. Applying RF energy based on notability values may include causing RF energy application only at excitation setups belonging to peaks having notability value above a threshold. Alternatively or additionally, applying RF energy based on notability values may include ranking peaks according to their notability value, and applying energy based on the ranking. For example, there may be three of more ranks, and the energy application may differ among the differently ranked peaks in the power level at which the excitation setups are applied, in the time duration, for which the excitation setups are applied, and/or in the amount of energy applied at excitation setups of the different peaks. For example, in some embodiments, energy is not applied at all at excitation setups belonging to the lowest rank peaks; energy is applied at full power at excitation setups belonging to the highest rank peaks; and intermediate power levels are applied at excitation setups belonging to intermediately ranked peaks. In some embodiments, higher notability values correspond to higher ranks. In some embodiments, ranking may be according to property other than (or additional to) notability. For example, ranking may be according to the maximum of a peak; a width of a peak; and/or the separation of the peak from the nearest adjacent peak.

In some embodiments, application of RF energy may be limited only to a predetermined portion of the identified peaks. For example, in some embodiments it may be determined that energy should be applied only 10% of the peaks. In such embodiments, if, for example, 100 peaks are identified, energy is applied only at 10 peaks. These may be, for example, the 10 peaks of highest AI value at the maximum, the 10 broadest (or narrowest) peaks; the 10 most notable peaks, etc. In some embodiments, application of RF energy may be limited to a predetermined number of peaks. For example, in some embodiments, energy may be applied only at 5 peaks. These may be, for example, the 5 peaks of highest ranks. In some embodiments, both a predetermined portion and a predetermined number may be set. In some such cases, the number of peaks at which RF energy is applied may be the larger between the predetermined portion and the predetermined number. For example, if the predetermined portion is 10% and the predetermined number is 20, and the number of identified peaks is 100, energy is applied at 20 peaks. While if 300 peaks are identified, energy is applied at 30 peaks. In some other cases, the number of peaks at which RF energy is applied may be the smaller between the predetermined portion and the predetermined number. For example, if the predetermined portion is 10% and the predetermined number is 20, and the number of identified peaks is 100, energy is applied at 10 peaks; while if 300 peaks are identified, energy is applied at 20 peaks. Applying energy to a peak may include applying energy at one or more excitation setups belonging to the peak, for example, only at the excitation setup associated with the maximum, at some excitation setups selected randomly among the excitation setups belonging to the peak, at all the excitation setups belonging to the peak, etc.

In some embodiments, the ranking may be global, that is, each peak is ranked in comparison to all the other identified peaks. In some embodiments, the ranking may be local, that is, peaks may be grouped into at least two groups, and each peak of one group is ranked in comparison to all the other peaks in the same group. In some embodiments, excitation setups grouped together differ in the value of one c-FAP and have common values in the other c-FAPs. For example, AI values may be measured at different phase relations and frequencies, and peaks may be identified according to the AI value at different frequencies and at a common phase relation, as discussed in relation to FIG. 5B. In some embodiments, a dissipation ratio (e.g., DR) may be determined for each radiating element, and the ranking may be carried out separately among excitation setups associated with each of the radiating elements. This may be the case, for example, when each excitation setup is applied by a single one of the radiating elements. In some embodiments, excitation setups may be supplied by two or more radiating elements simultaneously and coherently. The grouping in such a case may be, for example, according to groups of radiating elements emitting RF radiation simultaneously. For example, peaks in AI values measured when radiating elements #1 and #2 emitted RF radiation may be treated separately from AI values measured when radiation elements #3 and #4 emitted RF radiation.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. An apparatus for processing an object in a cavity resonator by application of radiofrequency (RF) energy to the cavity resonator through a plurality of feeds, the apparatus comprising:
   a source of RF energy;
   a detector configured to detect RF signals going out of the cavity resonator; and
   a processor configured to receive input from the detector and control the source of RF energy to excite in the cavity resonator RF fields at different excitation setups based on the input received from the detector,
   wherein the processor is configured to:
      associate with each excitation setup a value of an absorbability indicator;
      group excitation setups into a plurality of peaks based on values of absorbability indicator associated with each of the excitation setups;
      select at least one peak among the plurality of peaks based on the values of the absorbability indicator associated with the excitation setups grouped into each peak; and
      cause the source of RF energy to apply the RF energy to the cavity resonator based on the selection,
   wherein the excitation setups are multi-dimensional,
   wherein the source of RF energy comprises a plurality of synchronized RF energy sources controlled to feed the plurality of feeds with signals having a common frequency at one or both of a controlled phase difference and a controlled amplitude difference, and
   wherein the signals are emitted during overlapping time periods.

2. The apparatus of claim 1, wherein the RF energy source comprises a phase modulator controllable by the processor and configured to modulate a phase of a signal before the signal is applied to the cavity resonator, and one dimension of the multi-dimensional excitation setups is a phase difference between RF fields emitted by two of the plurality of feeds.

3. The apparatus of claim 1, wherein the processor controls the source of RF energy to apply the RF energy to the resonant cavity only at selected excitation setups.

4. The apparatus of claim 1, wherein the processor is configured to select among the peaks according to relations between the selected peaks and other peaks.

5. The apparatus of claim 1, wherein the processor is configured to select a predetermined number of peaks.

6. The apparatus of claim 1, wherein the processor is configured to select a predetermined portion of the peaks.

7. The apparatus of claim 1, wherein the absorbability indicator comprises a ratio of energy absorbed by the object to energy supplied to the plurality of feeds.

8. The apparatus of claim 1, wherein the absorbability indicator comprises a ratio of a sum of powers supplied to the plurality of feeds that emit energy simultaneously at a given frequency to the sum of power received by the plurality of feeds.

9. An apparatus for processing an object in a cavity resonator by application of radiofrequency (RF) energy to the cavity resonator through a plurality of feeds, the apparatus comprising:
   a source of RF energy;
   a detector configured to detect RF signals going out of the cavity resonator; and
   a processor configured to receive input from the detector and control the source of RF energy to excite in the cavity resonator RF fields at different excitation setups based on the input received from the detector,
   wherein the processor is configured to:
      associate with each excitation setup a value of an absorbability indicator;
      group excitation setups into a plurality of peaks based on values of absorbability indicator associated with each of the excitation setups;
      select at least one peak among the plurality of peaks based on the values of the absorbability indicator associated with the excitation setups grouped into each peak; and
      cause the source of RF energy to apply the RF energy to the cavity resonator based on the selection,
   wherein the excitation setups are multi-dimensional,
   wherein the RF energy source comprises a phase modulator controllable by the processor and configured to modulate a phase of a signal before the signal is applied to the cavity resonator, and one dimension of the multi-dimensional excitation setups is a phase difference between RF fields emitted by two of the plurality of feeds, and
   wherein a curve of the values of the absorbability indicator versus the phase difference has a maximum at each peak.

* * * * *